(12) United States Patent
Fleisig

(10) Patent No.: US 9,513,682 B2
(45) Date of Patent: Dec. 6, 2016

(54) TRANSPORTABLE ELECTRICAL POWER SUPPLYING DEVICE FOR STORING AND CONFIGURING EXCESS POWER CORD AND SHARING A MULTIPLICITY OF AC AND DC ELECTRICAL POWER SUPPLIES IN DIVERSE USER ENVIRONMENTS

(71) Applicant: Jeffrey Fleisig, Bloomfield, NJ (US)

(72) Inventor: Jeffrey Fleisig, Bloomfield, NJ (US)

(73) Assignee: PUCLINE, LLC, Venice, CA (US)

( * ) Notice: Subject to any disclaimer, the term of this patent is extended or adjusted under 35 U.S.C. 154(b) by 479 days.

(21) Appl. No.: 13/934,606

(22) Filed: Jul. 3, 2013

(65) Prior Publication Data

US 2015/0008741 A1    Jan. 8, 2015

(51) Int. Cl.
*H02J 3/02* (2006.01)
*H02J 3/14* (2006.01)
*G06F 1/26* (2006.01)
*H02J 7/00* (2006.01)

(52) U.S. Cl.
CPC .............. *G06F 1/266* (2013.01); *G06F 1/26* (2013.01); *B60L 2230/00* (2013.01); *H02J 7/0042* (2013.01); *Y10T 307/406* (2015.04)

(58) Field of Classification Search
USPC .......................................................... 307/31
See application file for complete search history.

(56) References Cited

U.S. PATENT DOCUMENTS 2,364,262 A   12/1944  Wehringer
2,587,707 A    3/1952  Dever
3,013,105 A   12/1961  Craig
3,495,799 A    2/1970  Murgas
3,924,819 A   12/1975  Lapinskas
(Continued)

OTHER PUBLICATIONS

"Donut Power Strip"; www.yankodesign.com/2008/10/28/donut-power-strip, 4 pages, Oct. 28, 2008.
(Continued)

*Primary Examiner* — Rexford Barnie
*Assistant Examiner* — Xuan Ly
(74) *Attorney, Agent, or Firm* — Thomas J. Perkowski, Esq., PC

(57) ABSTRACT

A transportable electrical power-supplying device for supplying AC and DC electrical power to a group of electrical appliances and/or electronic devices located in an environment. The transportable device has a housing supporting a plurality of electrical power receptacles for supplying AC and DC electrical power to a plurality of electrical appliances and/or electronic devices. The transportable device also has one or more external power cord storage compartments, for managing the excess length of power cords associated therewith. Any excess power cord can be wound up about a power cord spool within the power storage compartment, held firmly in place and concealed behind a set of spaced apart elastomeric structures forming a perimeter power cord opening. At the same time, any remaining power cord is allowed to exit the perimeter power cord opening at any point about the transportable device, and routed to an electrical appliance or electronic device requiring AC or DC electrical power in the workspace environment being serviced by the transportable device.

8 Claims, 32 Drawing Sheets

(56) References Cited

U.S. PATENT DOCUMENTS

| | | |
|---|---|---|
| 4,107,399 A | 8/1978 | Claxton |
| 4,124,261 A | 11/1978 | Klaus |
| 4,163,592 A | 8/1979 | Nelson |
| 4,177,961 A | 12/1979 | Gruenewald |
| 4,373,761 A | 2/1983 | Hansberry, Jr. |
| 4,384,758 A | 5/1983 | Lee et al. |
| 4,427,252 A | 1/1984 | Lee et al. |
| 4,468,083 A | 8/1984 | Lee et al. |
| 4,470,539 A | 9/1984 | Skillen |
| 4,566,925 A | 1/1986 | Schnabel et al. |
| 4,585,194 A | 4/1986 | Schwob |
| D288,920 S | 3/1987 | Oesterheld et al. |
| D290,598 S | 6/1987 | Jaffe et al. |
| 4,677,552 A | 6/1987 | Sibley |
| D290,836 S | 7/1987 | Oesterheld et al. |
| 4,705,484 A | 11/1987 | Lerner et al. |
| 4,731,029 A | 3/1988 | Lerner et al. |
| 4,899,268 A | 2/1990 | Hollinger |
| 4,908,744 A | 3/1990 | Hollinger |
| 5,016,241 A | 5/1991 | Lee et al. |
| 5,029,704 A | 7/1991 | Stillinger |
| 5,083,935 A | 1/1992 | Herman |
| D323,643 S | 2/1992 | Lee |
| 5,100,348 A | 3/1992 | Herman et al. |
| D326,257 S | 5/1992 | Lee et al. |
| D328,249 S | 7/1992 | Lee |
| D328,280 S | 7/1992 | Lee |
| D328,452 S | 8/1992 | Lee |
| D329,223 S | 9/1992 | Lee |
| D332,216 S | 1/1993 | Lee et al. |
| D332,398 S | 1/1993 | Lee et al. |
| 5,266,057 A | 11/1993 | Angel, Jr. et al. |
| D342,937 S | 1/1994 | Angel, Jr. et al. |
| 5,285,383 A | 2/1994 | Lindsey et al. |
| D347,825 S | 6/1994 | Zarnowitz et al. |
| 5,318,158 A | 6/1994 | Seasholtz |
| D349,594 S | 8/1994 | Bonazza |
| D351,342 S | 10/1994 | Lee et al. |
| 5,382,172 A | 1/1995 | Klier et al. |
| D356,297 S | 3/1995 | Carl et al. |
| D360,191 S | 7/1995 | Carl et al. |
| D360,400 S | 7/1995 | Pitcher |
| 5,457,600 A | 10/1995 | Campbell et al. |
| D366,862 S | 2/1996 | Lee |
| D366,863 S | 2/1996 | Lee |
| D366,864 S | 2/1996 | Lee |
| D367,036 S | 2/1996 | Lee |
| 5,529,513 A | 6/1996 | Lee |
| D371,762 S | 7/1996 | Lee |
| D372,193 S | 7/1996 | Lee |
| 5,531,333 A | 7/1996 | Vara |
| 5,538,385 A | 7/1996 | Bacchi et al. |
| D374,655 S | 10/1996 | Carl et al. |
| D374,862 S | 10/1996 | Lee |
| 5,564,942 A | 10/1996 | Lee |
| D376,580 S | 12/1996 | Lee |
| 5,589,718 A | 12/1996 | Lee |
| 5,596,479 A | 1/1997 | Campbell et al. |
| D380,963 S | 7/1997 | Lee |
| 5,655,725 A | 8/1997 | Kroger |
| D384,579 S | 10/1997 | Lee |
| D387,733 S | 12/1997 | Lee |
| D388,765 S | 1/1998 | Pitcher |
| D389,402 S | 1/1998 | Lee |
| D392,942 S | 3/1998 | Lee |
| D392,959 S | 3/1998 | Edwards |
| 5,736,673 A | 4/1998 | Lee |
| 5,741,113 A | 4/1998 | Bacchi et al. |
| D395,407 S | 6/1998 | Dwight |
| 5,765,444 A | 6/1998 | Bacchi et al. |
| D396,632 S | 8/1998 | Lee |
| D396,689 S | 8/1998 | Karten et al. |
| D396,986 S | 8/1998 | Robinson et al. |
| 5,792,986 A | 8/1998 | Lee |
| D399,123 S | 10/1998 | Dwight |
| D400,096 S | 10/1998 | Lee |
| D401,136 S | 11/1998 | Derman |
| 5,852,413 A | 12/1998 | Bacchi et al. |
| D404,716 S | 1/1999 | Lee |
| D405,050 S | 2/1999 | Lee |
| D405,056 S | 2/1999 | Lee |
| D405,057 S | 2/1999 | Martin et al. |
| D405,367 S | 2/1999 | Lee et al. |
| D405,368 S | 2/1999 | Lee |
| D405,688 S | 2/1999 | Lee et al. |
| D406,753 S | 3/1999 | Lee |
| D407,378 S | 3/1999 | Lee |
| 5,875,893 A | 3/1999 | Lee et al. |
| 5,901,712 A | 5/1999 | St. Peter |
| D412,314 S | 7/1999 | Lee |
| 5,923,147 A | 7/1999 | Martensson |
| 5,924,892 A | 7/1999 | Ferracina |
| 5,944,476 A | 8/1999 | Bacchi et al. |
| D415,101 S | 10/1999 | Martin |
| D415,111 S | 10/1999 | Lee |
| 5,984,717 A | 11/1999 | Lee |
| 5,988,569 A | 11/1999 | Zhang et al. |
| 6,011,221 A | 1/2000 | Lecinski et al. |
| 6,017,228 A | 1/2000 | Verbeek et al. |
| D420,331 S | 2/2000 | Martin et al. |
| 6,039,591 A | 3/2000 | Marsh et al. |
| D425,028 S | 5/2000 | Lee |
| D425,487 S | 5/2000 | Lee |
| D427,971 S | 7/2000 | Lee |
| D429,217 S | 8/2000 | Lee |
| D429,218 S | 8/2000 | Lee |
| D430,108 S | 8/2000 | Lee |
| 6,098,484 A | 8/2000 | Bacchi et al. |
| 6,105,454 A | 8/2000 | Bacchi et al. |
| 6,111,202 A | 8/2000 | Martin |
| D430,541 S | 9/2000 | Lee et al. |
| 6,126,381 A | 10/2000 | Bacchi et al. |
| 6,129,568 A | 10/2000 | Mercurio et al. |
| 6,141,221 A | 10/2000 | Tong et al. |
| D434,009 S | 11/2000 | Lee |
| 6,142,405 A | 11/2000 | Black |
| D435,558 S | 12/2000 | Tong et al. |
| 6,155,768 A | 12/2000 | Bacchi et al. |
| 6,160,265 A | 12/2000 | Bacchi et al. |
| 6,164,582 A | 12/2000 | Vara |
| D436,109 S | 1/2001 | Tong et al. |
| 6,176,716 B1 | 1/2001 | Mercurio et al. |
| D439,242 S | 3/2001 | Brown et al. |
| D440,203 S | 4/2001 | Ewing et al. |
| D440,942 S | 4/2001 | Ewing et al. |
| D441,343 S | 5/2001 | Lee |
| D442,550 S | 5/2001 | Tong et al. |
| D442,916 S | 5/2001 | Tong et al. |
| 6,227,914 B1 | 5/2001 | Lee et al. |
| 6,234,418 B1 | 5/2001 | Donaldson |
| 6,236,576 B1 | 5/2001 | Munk-Nielsen |
| D443,249 S | 6/2001 | Lee |
| D443,250 S | 6/2001 | Lee |
| D443,589 S | 6/2001 | Tong et al. |
| D443,591 S | 6/2001 | Tong et al. |
| D443,858 S | 6/2001 | Treiger et al. |
| D444,450 S | 7/2001 | Lee |
| D444,770 S | 7/2001 | Tong et al. |
| D445,091 S | 7/2001 | Tong et al. |
| D445,400 S | 7/2001 | Tong et al. |
| D445,401 S | 7/2001 | Tong et al. |
| D445,766 S | 7/2001 | Solomon |
| D446,189 S | 8/2001 | Lee |
| D446,503 S | 8/2001 | Lee |
| D446,504 S | 8/2001 | Lee |
| D447,118 S | 8/2001 | Lee |
| D447,119 S | 8/2001 | Lee |
| D447,120 S | 8/2001 | Lee |
| D447,745 S | 9/2001 | Lee |
| D450,296 S | 11/2001 | Lee |
| D450,297 S | 11/2001 | Lee |
| 6,315,604 B1 | 11/2001 | Lee |
| D452,215 S | 12/2001 | Stekelenburg |
| 6,336,105 B1 | 1/2002 | Conklin et al. |

(56) References Cited

U.S. PATENT DOCUMENTS

| | | |
|---|---|---|
| 6,341,979 B1 | 1/2002 | Yamamoto |
| D453,322 S | 2/2002 | Lee |
| D453,496 S | 2/2002 | Lee |
| D456,009 S | 4/2002 | Tong et al. |
| D456,362 S | 4/2002 | Lee |
| D456,363 S | 4/2002 | Lee |
| 6,369,999 B1 | 4/2002 | Wohlgemuth et al. |
| D457,059 S | 5/2002 | Macrae |
| D458,608 S | 6/2002 | Tong et al. |
| D459,219 S | 6/2002 | Lee |
| 6,406,313 B1 | 6/2002 | Victor |
| 6,410,855 B1 | 6/2002 | Berkowitz et al. |
| 6,410,994 B1 | 6/2002 | Jones et al. |
| 6,425,165 B2 | 7/2002 | Koppang |
| 6,425,543 B1 | 7/2002 | King |
| D462,890 S | 9/2002 | Brown |
| D463,373 S | 9/2002 | Lee |
| 6,456,091 B1 | 9/2002 | Lee et al. |
| 6,462,953 B2 | 10/2002 | Tong et al. |
| 6,473,510 B1 | 10/2002 | Marsh |
| D465,456 S | 11/2002 | Lee |
| 6,483,200 B1 | 11/2002 | Jacobs |
| 6,486,407 B1 | 11/2002 | Hawker et al. |
| D466,405 S | 12/2002 | Lee |
| D467,226 S | 12/2002 | Lee |
| D467,227 S | 12/2002 | Lee |
| D467,246 S | 12/2002 | Macrae |
| D467,552 S | 12/2002 | Mori et al. |
| D467,877 S | 12/2002 | Mori et al. |
| D467,879 S | 12/2002 | Lee |
| 6,493,683 B1 | 12/2002 | David et al. |
| 6,497,382 B2 | 12/2002 | King |
| D468,262 S | 1/2003 | Lee |
| D468,263 S | 1/2003 | Lee |
| D468,689 S | 1/2003 | Lee |
| 6,504,468 B2 | 1/2003 | Lee et al. |
| 6,505,566 B1 | 1/2003 | Foster et al. |
| D470,047 S | 2/2003 | Lee et al. |
| D471,442 S | 3/2003 | Lee |
| D471,870 S | 3/2003 | Lee |
| D473,194 S | 4/2003 | Lee |
| 6,547,599 B2 | 4/2003 | Kinsey et al. |
| 6,554,218 B2 | 4/2003 | Buyce et al. |
| 6,559,893 B1 | 5/2003 | Martin |
| 6,560,102 B1 | 5/2003 | Tong et al. |
| 6,567,277 B1 | 5/2003 | Doherty et al. |
| 6,573,617 B2 | 6/2003 | Jones et al. |
| 6,588,609 B1 | 7/2003 | Richet et al. |
| 6,589,073 B2 | 7/2003 | Lee |
| 6,600,479 B1 | 7/2003 | Smith et al. |
| 6,614,636 B1 | 9/2003 | Marsh |
| 6,637,166 B2 | 10/2003 | Kinsey |
| 6,640,041 B2 | 10/2003 | Ichinari et al. |
| 6,644,993 B2 | 11/2003 | Victor |
| 6,683,770 B1 | 1/2004 | Marsh |
| 6,716,044 B2 | 4/2004 | Bertke |
| D490,779 S | 6/2004 | Lee |
| D492,054 S | 6/2004 | Donegani et al. |
| 6,743,025 B2 | 6/2004 | Howard |
| 6,746,272 B2 | 6/2004 | Bean |
| 6,756,543 B1 | 6/2004 | Kaloustian |
| 6,779,370 B2 | 8/2004 | Bellow, Jr. et al. |
| D496,118 S | 9/2004 | Donegani et al. |
| 6,805,581 B2 | 10/2004 | Love |
| D498,555 S | 11/2004 | Donegani et al. |
| D502,924 S | 3/2005 | Sirichai et al. |
| D503,152 S | 3/2005 | Suckle et al. |
| D503,153 S | 3/2005 | Suckle et al. |
| 6,868,401 B1 | 3/2005 | Carpenter et al. |
| 6,872,086 B2 | 3/2005 | Milan |
| D504,064 S | 4/2005 | Lee et al. |
| D504,112 S | 4/2005 | Suckle et al. |
| D505,390 S | 5/2005 | Lee et al. |
| D505,657 S | 5/2005 | Suckle et al. |
| D506,184 S | 6/2005 | Sirichai et al. |
| D506,726 S | 6/2005 | Suckle et al. |
| 6,902,429 B1 | 6/2005 | Brooks |
| 6,907,402 B1 | 6/2005 | Khaitan |
| 6,907,686 B2 | 6/2005 | Symons |
| D507,540 S | 7/2005 | Suckle |
| 6,921,284 B2 | 7/2005 | Sirichai et al. |
| D508,232 S | 8/2005 | Suckle et al. |
| D509,185 S | 9/2005 | Suckle et al. |
| D509,727 S | 9/2005 | Suckle et al. |
| D510,091 S | 9/2005 | Mori et al. |
| 6,941,395 B1 | 9/2005 | Galang et al. |
| D510,572 S | 10/2005 | Lee et al. |
| D510,907 S | 10/2005 | Suckle et al. |
| D511,501 S | 11/2005 | Lee et al. |
| 6,966,791 B1 | 11/2005 | Farr |
| D512,381 S | 12/2005 | Sirichai et al. |
| D512,718 S | 12/2005 | Mori et al. |
| 6,971,254 B2 | 12/2005 | Bellow, Jr. et al. |
| D513,408 S | 1/2006 | Suckle |
| D513,409 S | 1/2006 | Suckle |
| D514,523 S | 2/2006 | Lee et al. |
| D514,524 S | 2/2006 | Suckle |
| D515,508 S | 2/2006 | Lee |
| D516,032 S | 2/2006 | Suckle et al. |
| 7,001,211 B2 | 2/2006 | Lichtscheidl et al. |
| D517,497 S | 3/2006 | Lee |
| D517,984 S | 3/2006 | Suckle et al. |
| D519,079 S | 4/2006 | Suckle |
| D519,464 S | 4/2006 | Suckle et al. |
| D519,465 S | 4/2006 | Sirichai et al. |
| 7,025,627 B2 | 4/2006 | Rosenthal et al. |
| D519,837 S | 5/2006 | Sturk et al. |
| D519,933 S | 5/2006 | Suckle et al. |
| D519,934 S | 5/2006 | Wada et al. |
| D520,457 S | 5/2006 | Wada et al. |
| D520,458 S | 5/2006 | Wada et al. |
| D520,460 S | 5/2006 | Wadsworth et al. |
| D520,951 S | 5/2006 | Mori et al. |
| D521,452 S | 5/2006 | Mori et al. |
| D521,860 S | 5/2006 | Lee et al. |
| D523,750 S | 6/2006 | Lee et al. |
| 7,062,870 B1 | 6/2006 | You |
| D524,642 S | 7/2006 | Suckle et al. |
| D524,759 S | 7/2006 | Wada et al. |
| 7,077,693 B1 | 7/2006 | Symons |
| 7,080,812 B2 | 7/2006 | Wadsworth et al. |
| 7,083,421 B1 | 8/2006 | Mori |
| 7,097,469 B2 | 8/2006 | Jacobs |
| 7,098,406 B1 | 8/2006 | Hammonds |
| 7,099,836 B2 | 8/2006 | Cichanowicz |
| 7,106,182 B2 | 9/2006 | DeWilde |
| 7,108,533 B2 | 9/2006 | Howard |
| 7,112,097 B1 | 9/2006 | Lam |
| D530,717 S | 10/2006 | Mori et al. |
| 7,140,586 B2 | 11/2006 | Seil et al. |
| D533,063 S | 12/2006 | Lee et al. |
| 7,149,717 B1 | 12/2006 | Kan |
| D535,947 S | 1/2007 | Suckle et al. |
| 7,167,372 B2 | 1/2007 | Mori et al. |
| 7,171,386 B1 | 1/2007 | Raykhman |
| D536,303 S | 2/2007 | Suckle et al. |
| D537,780 S | 3/2007 | Suckle |
| D537,784 S | 3/2007 | Suckle et al. |
| D539,735 S | 4/2007 | Suckle |
| D542,123 S | 5/2007 | Symons |
| D543,148 S | 5/2007 | Suckle et al. |
| D543,154 S | 5/2007 | Suckle et al. |
| D543,155 S | 5/2007 | Suckle |
| D543,156 S | 5/2007 | Suckle |
| D543,157 S | 5/2007 | Suckle |
| 7,223,122 B2 | 5/2007 | Mori |
| D543,942 S | 6/2007 | Howard |
| D545,179 S | 6/2007 | Mori et al. |
| 7,233,086 B2 | 6/2007 | Borden et al. |
| 7,236,209 B2 | 6/2007 | Martin |
| D546,811 S | 7/2007 | Neu et al. |
| D547,486 S | 7/2007 | Donegani et al. |
| 7,239,892 B2 | 7/2007 | Martin |
| 7,240,111 B2 | 7/2007 | VanHarlingen et al. |

(56) References Cited

U.S. PATENT DOCUMENTS

| | | |
|---|---|---|
| 7,242,577 B2 | 7/2007 | Sween et al. |
| 7,243,077 B2 | 7/2007 | Broden et al. |
| 7,247,798 B2 | 7/2007 | Pagoto et al. |
| 7,247,799 B2 | 7/2007 | Mori et al. |
| D549,174 S | 8/2007 | Lee et al. |
| D549,210 S | 8/2007 | Neu et al. |
| D549,557 S | 8/2007 | Mori et al. |
| D549,662 S | 8/2007 | Lee et al. |
| D553,568 S | 10/2007 | Lee et al. |
| 7,286,046 B2 | 10/2007 | Kinsey et al. |
| D556,019 S | 11/2007 | Symons |
| D556,134 S | 11/2007 | Lee et al. |
| 7,292,881 B2 | 11/2007 | Seil et al. |
| 7,293,651 B2 | 11/2007 | Lee et al. |
| D556,689 S | 12/2007 | Lee et al. |
| D557,495 S | 12/2007 | Chan et al. |
| D560,609 S | 1/2008 | Rosenthal et al. |
| 7,318,567 B2 | 1/2008 | Mori et al. |
| 7,318,750 B1 | 1/2008 | Chacon et al. |
| 7,319,984 B2 | 1/2008 | Frankel et al. |
| 7,324,334 B2 | 1/2008 | Sween et al. |
| D561,093 S | 2/2008 | Sween et al. |
| D561,094 S | 2/2008 | Sween et al. |
| D561,687 S | 2/2008 | Sween et al. |
| D561,762 S | 2/2008 | Mori |
| 7,329,152 B2 | 2/2008 | Mori et al. |
| 7,335,053 B2 | 2/2008 | Avevor et al. |
| D563,872 S | 3/2008 | Lee et al. |
| D563,897 S | 3/2008 | Lee et al. |
| D563,898 S | 3/2008 | Lee et al. |
| D563,899 S | 3/2008 | Goetz et al. |
| D564,447 S | 3/2008 | Lee et al. |
| 7,361,050 B2 | 4/2008 | Mori et al. |
| D570,598 S | 6/2008 | Chan |
| D570,788 S | 6/2008 | Lee et al. |
| D570,789 S | 6/2008 | Lee et al. |
| D571,733 S | 6/2008 | Seil |
| 7,381,095 B2 | 6/2008 | Freeman et al. |
| 7,385,403 B2 | 6/2008 | Ferrer et al. |
| D572,230 S | 7/2008 | Neu et al. |
| D573,103 S | 7/2008 | Lee et al. |
| 7,397,654 B2 | 7/2008 | Mori |
| 7,399,199 B2 | 7/2008 | Symons |
| 7,399,200 B1 | 7/2008 | Eliseo |
| 7,399,201 B1 | 7/2008 | Khorsand |
| 7,413,155 B2 | 8/2008 | Seil et al. |
| 7,417,850 B1 | 8/2008 | Pulido |
| D576,030 S | 9/2008 | Lee et al. |
| D576,166 S | 9/2008 | Mori et al. |
| D576,553 S | 9/2008 | Lee et al. |
| D577,577 S | 9/2008 | Lee et al. |
| 7,429,197 B2 | 9/2008 | Weis et al. |
| 7,432,619 B2 | 10/2008 | Voll et al. |
| 7,433,839 B2 | 10/2008 | Bodurtha et al. |
| 7,435,901 B2 | 10/2008 | Mori et al. |
| 7,436,087 B2 | 10/2008 | Borden et al. |
| 7,438,567 B2 | 10/2008 | Nalwad et al. |
| 7,440,913 B2 | 10/2008 | Nozaki |
| 7,442,090 B2 | 10/2008 | Mori et al. |
| D580,441 S | 11/2008 | Mori |
| D581,669 S | 12/2008 | Sween et al. |
| 7,461,941 B2 | 12/2008 | Martin |
| D584,225 S | 1/2009 | Lee et al. |
| D585,836 S | 2/2009 | Lee et al. |
| D587,246 S | 2/2009 | Neu et al. |
| 7,484,990 B1 | 2/2009 | Lee et al. |
| D588,000 S | 3/2009 | Goetz et al. |
| D588,065 S | 3/2009 | Wadsworth et al. |
| D588,442 S | 3/2009 | Chong et al. |
| D588,546 S | 3/2009 | Lee et al. |
| D588,547 S | 3/2009 | Lee et al. |
| D588,549 S | 3/2009 | Lee et al. |
| D588,904 S | 3/2009 | Chong et al. |
| D589,456 S | 3/2009 | Puluc et al. |
| 7,498,687 B2 | 3/2009 | Kinsey et al. |
| 7,501,580 B2 | 3/2009 | Pagoto et al. |
| 7,510,420 B2 | 3/2009 | Mori |
| 7,518,265 B2 | 4/2009 | Roepke |
| D593,034 S | 5/2009 | Mori et al. |
| D593,954 S | 6/2009 | Lee et al. |
| 7,663,866 B2 | 2/2010 | Lee et al. |
| 7,689,500 B2 | 3/2010 | Cottrell |
| 7,707,086 B2 | 4/2010 | Burns et al. |
| 7,742,979 B2 | 6/2010 | Reding et al. |
| 7,813,984 B2 | 10/2010 | Korzinin |
| 7,827,083 B2 | 11/2010 | Beurskens |
| 7,831,502 B2 | 11/2010 | Cummings et al. |
| 7,904,373 B2 | 3/2011 | Kimle et al. |
| 7,912,781 B2 | 3/2011 | Rosenthal |
| 7,945,505 B2 | 5/2011 | Van Slyke |
| 7,991,685 B2 | 8/2011 | Tatge et al. |
| 8,002,586 B2 | 8/2011 | Fleisig |
| 8,002,587 B2 | 8/2011 | Fleisig |
| 8,015,089 B1 | 9/2011 | Baya'a et al. |
| 8,016,611 B2 | 9/2011 | Fleisig |
| 8,036,966 B2 | 10/2011 | Brittan et al. |
| D648,685 S | 11/2011 | Symons |
| 8,055,573 B2 | 11/2011 | Schlecht |
| 8,159,085 B2 | 4/2012 | Fleisig |
| 8,174,147 B2 | 5/2012 | Fleisig |
| 8,180,698 B2 | 5/2012 | Lerner |
| 8,193,658 B2 | 6/2012 | Fleisig |
| 8,195,544 B2 | 6/2012 | Horsfall |
| 8,217,528 B2 | 7/2012 | Fleisig |
| 8,230,995 B2 | 7/2012 | Andrews et al. |
| 8,239,313 B2 | 8/2012 | Jenkins et al. |
| 8,249,975 B1 | 8/2012 | Keith |
| 8,255,296 B2 | 8/2012 | Hardison, III |
| 8,589,261 B2 | 11/2013 | Hardison, III |
| 8,626,626 B2 | 1/2014 | Hardison, III |
| 2002/0189848 A1 | 12/2002 | Hawker et al. |
| 2003/0038209 A1 | 2/2003 | Remeczky |
| 2003/0066936 A1 | 4/2003 | Beck et al. |
| 2003/0121742 A1 | 7/2003 | Hardy |
| 2003/0188880 A1 | 10/2003 | McClellan et al. |
| 2004/0160150 A1 | 8/2004 | Hay et al. |
| 2005/0029984 A1 | 2/2005 | Cheng et al. |
| 2006/0065422 A1 | 3/2006 | Broyles |
| 2006/0196995 A1 | 9/2006 | Mori et al. |
| 2006/0276077 A1 | 12/2006 | Mori |
| 2007/0039755 A1 | 2/2007 | Mori et al. |
| 2007/0111585 A1 | 5/2007 | Mori et al. |
| 2007/0180665 A1 | 8/2007 | Sween et al. |
| 2007/0235222 A1 | 10/2007 | Hubbard |
| 2007/0261874 A1 | 11/2007 | Pagoto et al. |
| 2007/0275594 A1 | 11/2007 | Greenberg |
| 2007/0295529 A1 | 12/2007 | Mori et al. |
| 2008/0104427 A1 | 5/2008 | Yee et al. |
| 2008/0111013 A1 | 5/2008 | Suckle et al. |
| 2008/0112152 A1 | 5/2008 | Figueroa et al. |
| 2008/0113563 A1 | 5/2008 | Roepke et al. |
| 2008/0194139 A1 | 8/2008 | Chan |
| 2008/0302687 A1 | 12/2008 | Sirichai et al. |
| 2008/0315734 A1 | 12/2008 | Birsel et al. |
| 2010/0104278 A1 | 4/2010 | Livingston et al. |
| 2011/0076874 A1* | 3/2011 | Fleisig ................ H01R 13/665 439/488 |
| 2011/0076875 A1 | 3/2011 | Fleisig |
| 2011/0076877 A1 | 3/2011 | Fleisig et al. |
| 2011/0076878 A1 | 3/2011 | Fleisig |
| 2011/0076879 A1 | 3/2011 | Fleisig |
| 2011/0076882 A1 | 3/2011 | Fleisig |
| 2014/0367138 A1* | 12/2014 | Godfrey ................ G06F 1/26 174/69 |

OTHER PUBLICATIONS

"Donut", Ramei Keum, www,rameikeum.com, 2 pages, 2008.
"Power + Trashcan", Greg Fulco Products, one page, 2010.
"PowerPod", Steelcase, Inc., two pages, 2010.
"Projectors Galore", http://high-tech-360.blogspot.com/2009/05/projectors-galore.html, 3 page, Jul. 1, 2010.
"Sail", Marek Wenglorz, www.coroflot.com, 1 page, 2009.

(56) References Cited

OTHER PUBLICATIONS

"Spy Box", Marek Wenglorz, www.coroflot.com, 1 page, 2009.
"Surge3000 Calamari Edition: Surge Protector", Trident Design, LLC, Powersquid.com, two pages, 2009.
"Wardrobe valley with surge protector", Comfort House, Inc., one page, 2010.
Descriptive Materials on the Punkt ES 01 Extension Socket, by the PunktGroup, published at http://www.punktgroup.com/en/154/gallery.aspx, and launched on Sep. 7, 2012 (7 Pages).
Online product advertisement entitled 'Cable Management the Easy Way', http://cableorganizer.com/, pp. 1 through 4. 2009.
Online product advertisement entitled 'Hardwood Electrics', http://ihwe.com/cordboxes/, pp. 1 and 2. 2009.
Online product advertisement entitled 'Kangaroom Black Box Cord Organizer', http://kangaroomstorage.com/product/charging-%2B-orga . . . , pp. 1 and 2. 2009.
Online product advertisement entitled 'The Sanctuary Power Charger Station and Desk Valet', http://cableorganizer.com/blue-lounge-designs/sanctuary.html, pp. 1 through 10. 2009.

* cited by examiner

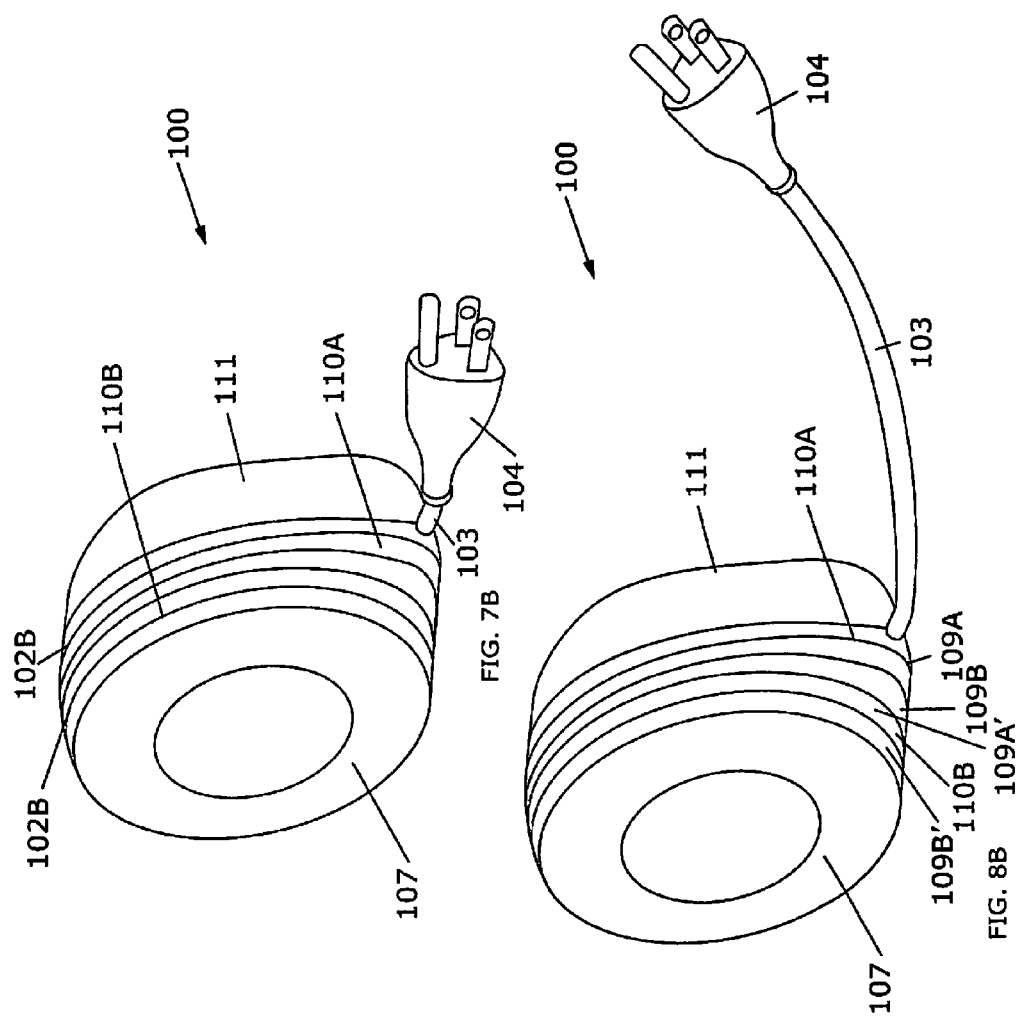

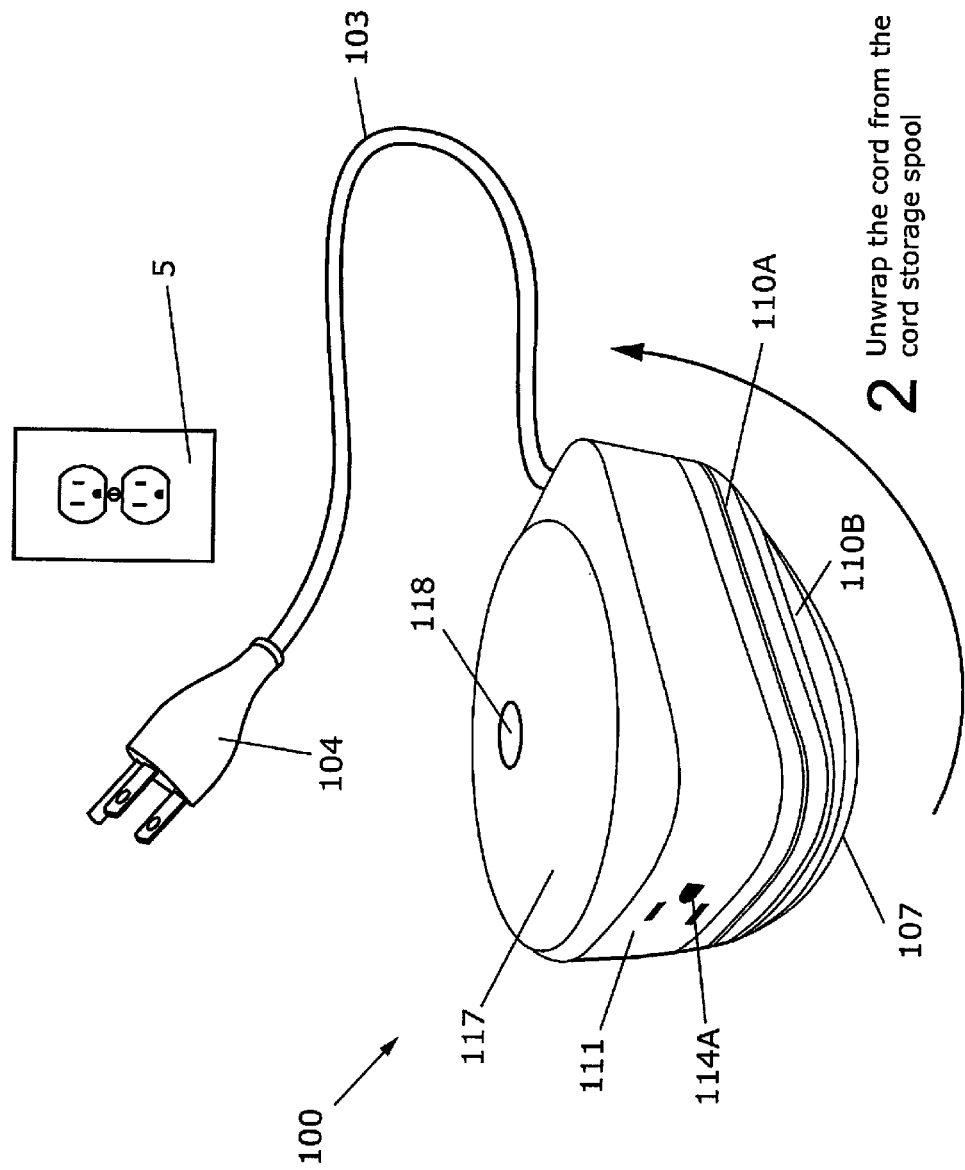

6  Plug in other devices either in electric sockets or USB connectors to power multiple devices simultaneously

US 9,513,682 B2

TRANSPORTABLE ELECTRICAL POWER SUPPLYING DEVICE FOR STORING AND CONFIGURING EXCESS POWER CORD AND SHARING A MULTIPLICITY OF AC AND DC ELECTRICAL POWER SUPPLIES IN DIVERSE USER ENVIRONMENTS

BACKGROUND OF INVENTION

Field of Invention

The present invention relates to new and improved methods of and apparatus for supplying electrical power to electrical appliances and managing the power cords associated therewith in diverse environments, wherein multiple power receptacles are required.

Brief Description of the State of Knowledge in the Art

The modern lifestyle of millions of consumers involves the use of rechargeable phones, rechargeable cameras, portable laptop computers, rechargeable tablets, modems, powered hard drives, powered Bluetooth® speakers, and many other kinds of portable electronic devices that consume either AC or DC electrical power. Users of such portable devices are constantly plugging and unplugging devices, often kneeling down for a nearby power outlet or searching behind a fixed piece of furniture for a free outlet that is not accessible, or which is not within reach, but only to discover that the power outlet is already being used.

Traditional power strips are bulky and designed for floor use and lack a usable cord management option. Also, while other prior art devices have addressed cord management, they have not done so in ways which are both convenient and efficient for the users of modern portable powered devices, who are constantly on the move.

Therefore, there is a great need in the art for a new and improved portable electrical power supplying device that addresses the unfulfilled needs of millions of consumers to power multiple portable devices in diverse users environments, with a greater level of electrical power accessibility, improved power cord management, and reduced clutter in all end-user environments, while avoiding the shortcomings and drawbacks of prior art devices and methodologies.

OBJECTS AND SUMMARY OF THE PRESENT INVENTION

It is therefore a primary object of the present invention to provide a new and improved transportable device that fulfills needs of millions of consumers to power multiple electrical appliances and/or electronic devices in diverse users environments, with a greater level of electrical power accessibility, improved power cord management, and reduced clutter in all end-user environments, while avoiding the shortcomings and drawbacks of prior art devices and methodologies.

Another object of the present invention is to provide a transportable device for supplying electrical power to electrical appliances and/or electronic devices and managing and concealing excess power cords deployed in diverse environments, wherever a multitude of power outlets are required, while overcoming the shortcomings and drawbacks of prior art methods and apparatus.

Another object of the present invention is to provide transportable electrical power supplying device for storing and configuring excess power cord and sharing a multiplicity of AC and DC electrical power supplies in diverse end-user environments.

Another object of the present invention is to provide a transportable electrical power supplying device having a power-receptacle supplying structure supporting a plurality of electrical power receptacles for supplying AC and DC electrical power to a plurality of electrical appliances and/or electronic devices, and managing the excess length of power cords associated therewith, in a manner so that excess power cord can be wound up about a power cord spool and concealed behind spaced apart elastomeric structures forming a perimeter power cord opening, and remaining power cord is allowed to exit the perimeter power cord opening at any point about the device, and routed to an appliance or device requiring AC or DC electrical power in the workspace environment being serviced by the transportable device.

Another object of the present invention is to provide a novel method of supplying electrical power to a plurality of electrical appliances and/or electronic devices in any environment, using a transportable electrical power supplying device, while managing excess power cord therewithin.

Another object of the present invention is to provide a novel electrical power supplying device having dual integrated power cord storage compartments, and externally accessible USB power ports for supplying DC electrical power to USB-powered electronic devices and externally accessible 120 Volt power outlets for supplying AC electrical power to 120 Volt electrical appliances, and excess power cord being stored and concealed within external power cord storage compartments integrated within the device housing Another object of the present invention is to provide a novel transportable electrical power supplying device comprising: a lower housing portion supporting a set of dual external elastomeric power cord storage compartments above its bottom end; a power cord storage spool contained within each power cord storage compartment; an upper housing portion having an interior volume containing a printed circuit (PC) board supplying electrical power to 120 Volt and USB electrical power receptacles mounted through apertures formed through the side walls of the upper housing portion; an LED-based power-on indicator light; and a cover portion for closing off the interior volume of the upper housing portion with the LED-based power-on indicator light illuminating the centrally disposed logo/badge mounted on the cover portion.

Another object of the present invention is to provide a novel transportable electrical power supplying device, wherein the USB power cables of electronic devices can be plugged into USB power ports in the upper housing portion, and electrical appliance plugs can be plugged into 120 Volt electrical power receptacles mounted in the upper housing portion, and wherein the excess power cord of the power extension cord can be wound up about and concealed within the first external power cord compartment disposed between the upper housing portion and the base portion of the device, and one of the appliance power cords is partially wound up about the second external power cord storage compartment and directed to its associated electrical appliance or electronic device.

These and other objects of invention will become apparent hereinafter and in the Claims to Invention appended hereto.

BRIEF DESCRIPTION OF THE DRAWINGS

In order to more fully understand the objects of the present invention, the following detailed description of the illustrative embodiments should be read in conjunction with the accompanying figure Drawings in which:

FIG. 7A FIG. 1A is a first perspective view of a second illustrative embodiment of the electrical power supplying device of the present invention with its extension-type power cord wound up and un-extended from the housing;

FIG. 7B is a second perspective view of the second illustrative embodiment of the transportable electrical power supplying device shown in FIG. 7A, with its extension-type power cord unwound and extended from the housing;

FIG. 8B is an elevated second side view of the second illustrative embodiment of the transportable electrical power supplying device shown in FIGS. 7A, 7B and 8A, with its extension-type power cord unwound and extended from the housing, its dual integrated cord storage compartments not being used to store excess power cord associated with electrical appliances, and its pair of USB power ports not being used to supply power to any USB-powered devices;

FIG. 16B is perspective view of the electrical power supplying device of the second illustrative embodiment, shown in FIGS. 7A through 12, illustrating that the second step of the method involves unwrapping the power extension cord from the external cord storage compartment;

DETAILED DESCRIPTION OF THE ILLUSTRATIVE EMBODIMENTS OF THE PRESENT INVENTION

Figure 1A:
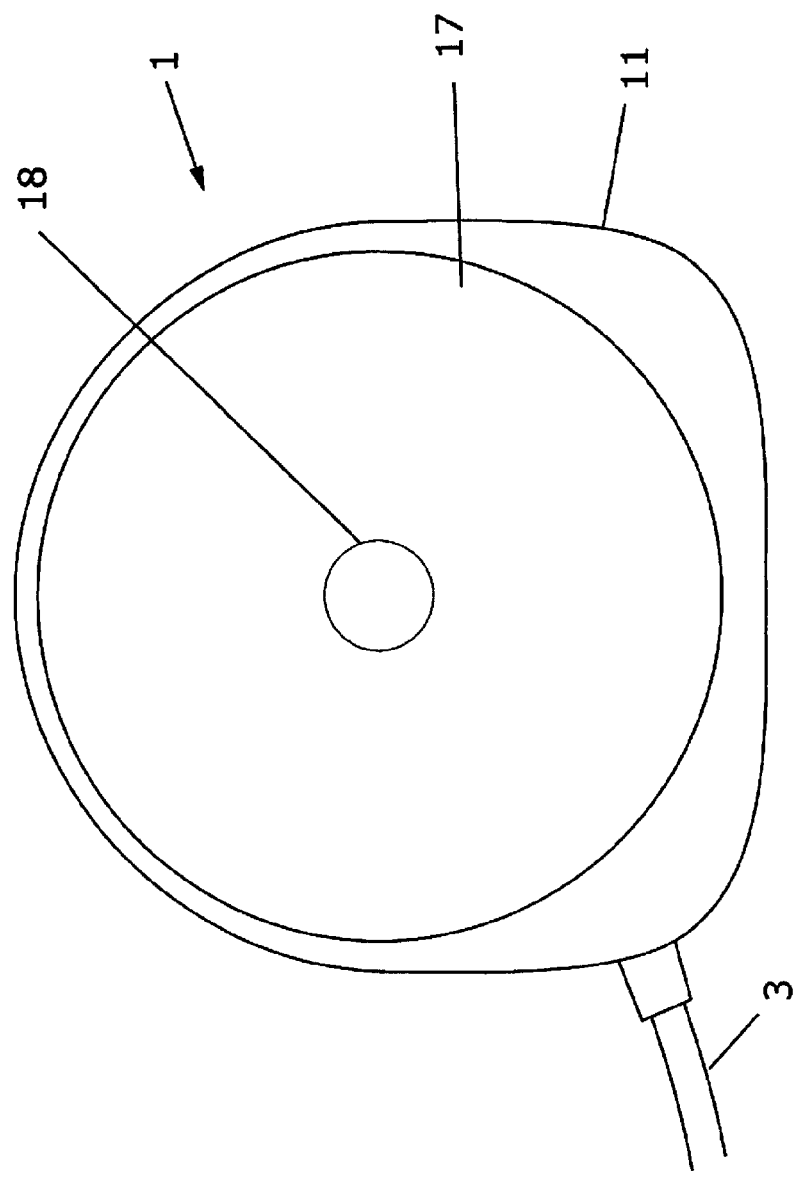
FIG. 1A is an elevated top view of a first illustrative embodiment of the transportable electrical power supplying device of the present invention with its extension-type power cord unwound and extended from the housing, and its pair of USB power ports not being used to supply power to any USB-powered electronic devices.

In general, the present invention provides a new and improved method of and transportable apparatus for supplying electrical power to AC and DC electrical-energy consuming appliances and devices, and managing the power cords thereof, while employed in diverse environments, such as workstations, desktops, library tables, cafes, restaurants, and wherever a multitude of electrical power outlets are required or desired by one or more users.

In a first illustrative embodiment, depicted in FIGS. 1A through 6, the apparatus is realized in the form of a transportable (e.g. portable, mobile, relocatable) electrical power supplying device 1 having a single external integrated power cord storage compartment 2. This transportable device can be supported on or under the desktop, on the floor, or even on a wall-surface, and supplied with electrical power through a flexible power supply cord 3 having a power plug 4 for plugging into a standard 120 Volt power receptacle 5.

In a second illustrative embodiment, depicted in FIGS. 7A through 18B, the apparatus is realized in the form of a portable electrical power supplying device 100 having dual external integrated power cord storage compartments 102A and 102B. Also, this device can be supported on or under the desktop, on the floor, or even on a wall-surface, and supplied with electrical power through a flexible power supply cord 103, plugged into a standard 120 Volt power receptacle 5 by power plug 104.

These illustrative embodiments of the present invention will now be disclosed and described in greater detail hereinafter.

Figure 1B:
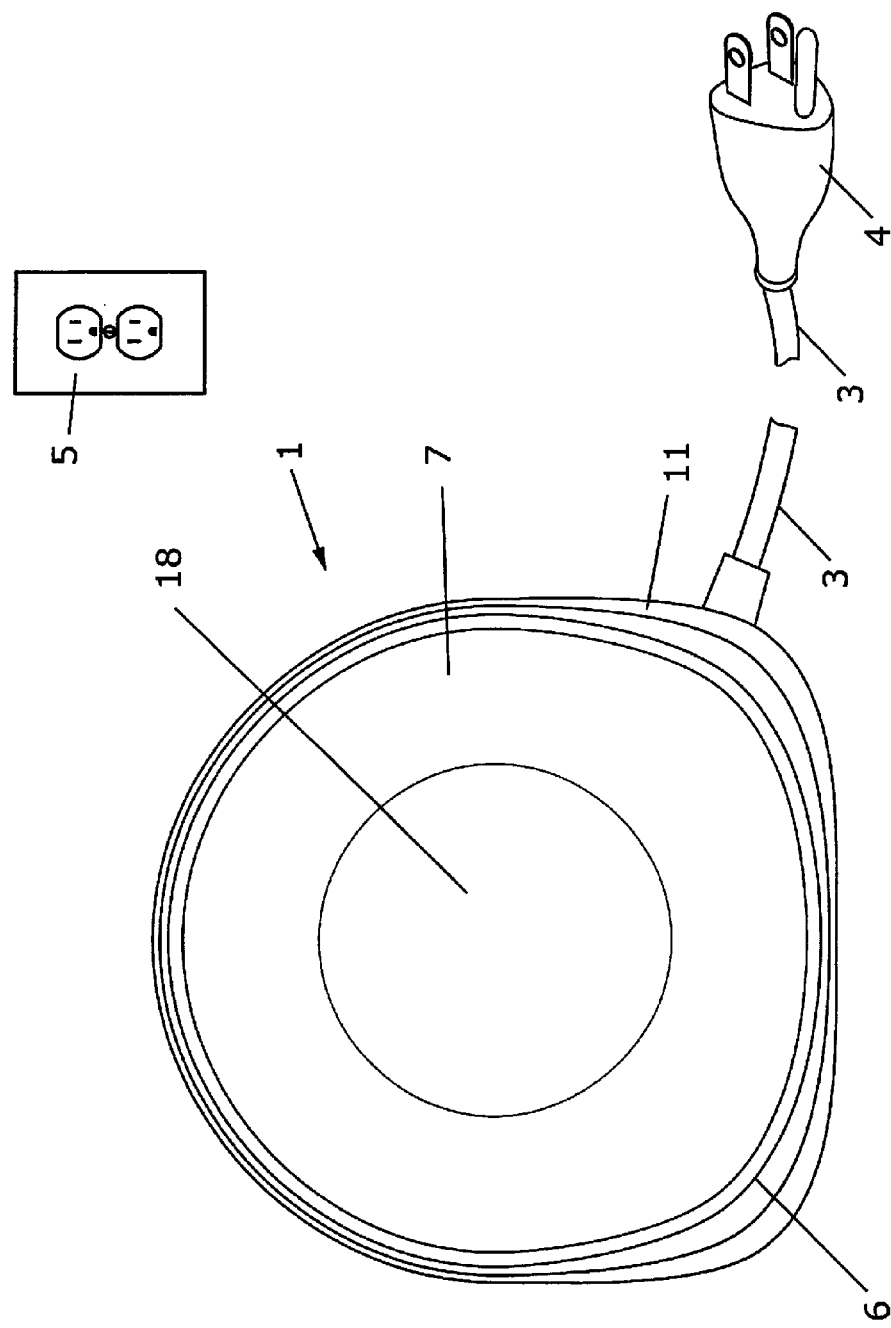
FIG. 1B is an elevated bottom view of the first illustrative embodiment of the transportable electrical power supplying device shown in FIG. 1A, with its extension-type power cord unwound and extended from the housing, and its pair of USB power ports not being used to supply power to any USB-powered electronic devices.

The Transsportable Electrical Power Supplying Device According to a First Illustrative Embodiment of the Present Invention In FIGS. 1A and 1B, the transportable power supplying device 1 of the present invention is supported vertically on a surface and is supplied with electrical power through a flexible extension power cord 3 whose electrical plug 4 is plugged in a standard electrical power receptacle 5. As shown, a number of different AC and DC electrical power consuming appliances (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers etc) can be powered by device the through a plurality of power cords, routed through the environment into the device 1. The device 1 powered up when plugging the device into a 120 Volt AC power outlet, causing the ON-OFF indicator 16, 18 on the housing cover 17 to illuminate.

Figure 2A:
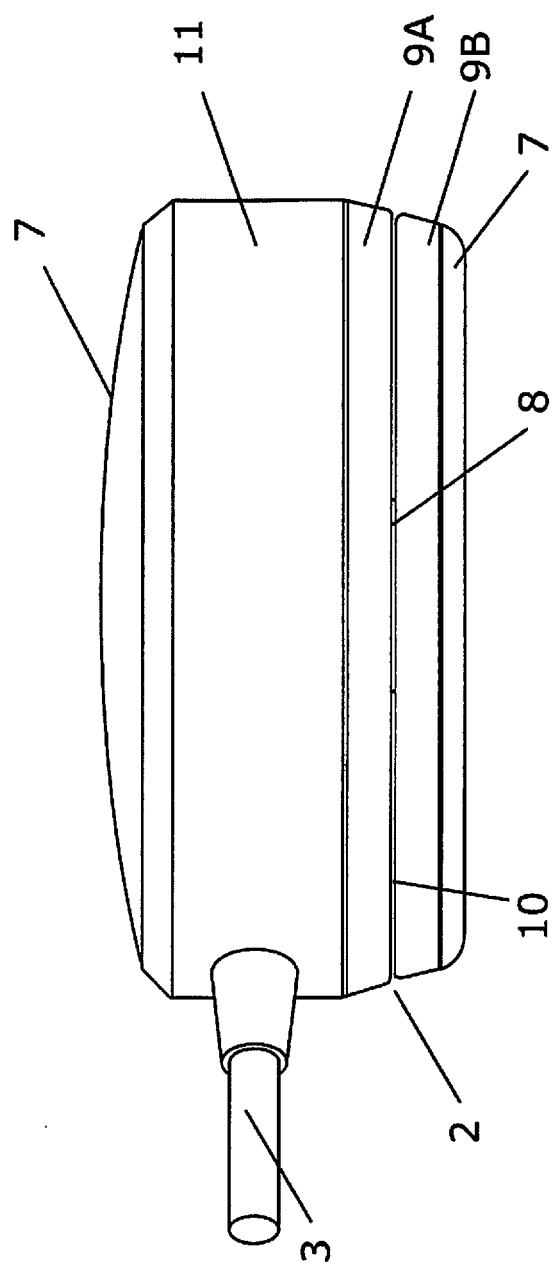
FIG. 2A is an elevated first side view of the first illustrative embodiment of the transportable electrical power supplying device shown in FIGS. 1A and 1B, with its extension-type power cord unwound and extended from the housing, and its integrated cord storage compartment not being used to store excess power cord associated with any electrical appliances.
Figure 2B:
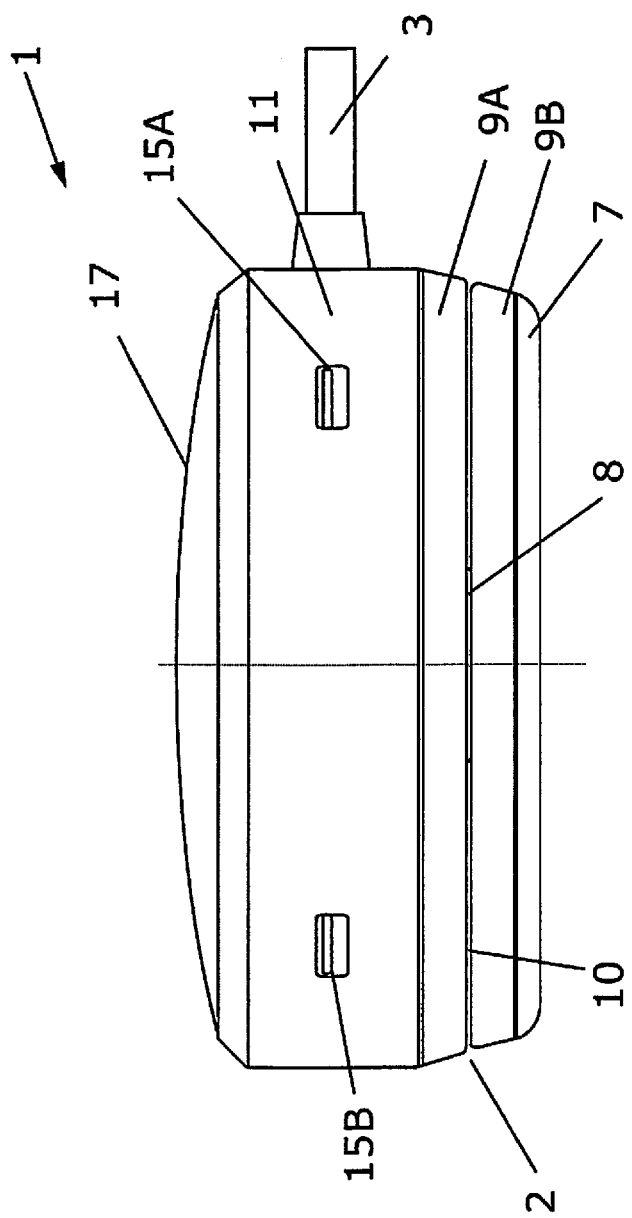
FIG. 2B is an elevated second side view of the first illustrative embodiment of the transportable electrical power supplying device shown in FIGS. 1A, 1B and 2A, with its extension-type power cord unwound and extended from the housing, its integrated cord storage compartment not being used to store excess power cord associated with electrical appliances, and its pair of USB power ports not being used to supply power to USB-powered electronic devices.
Figure 2C:
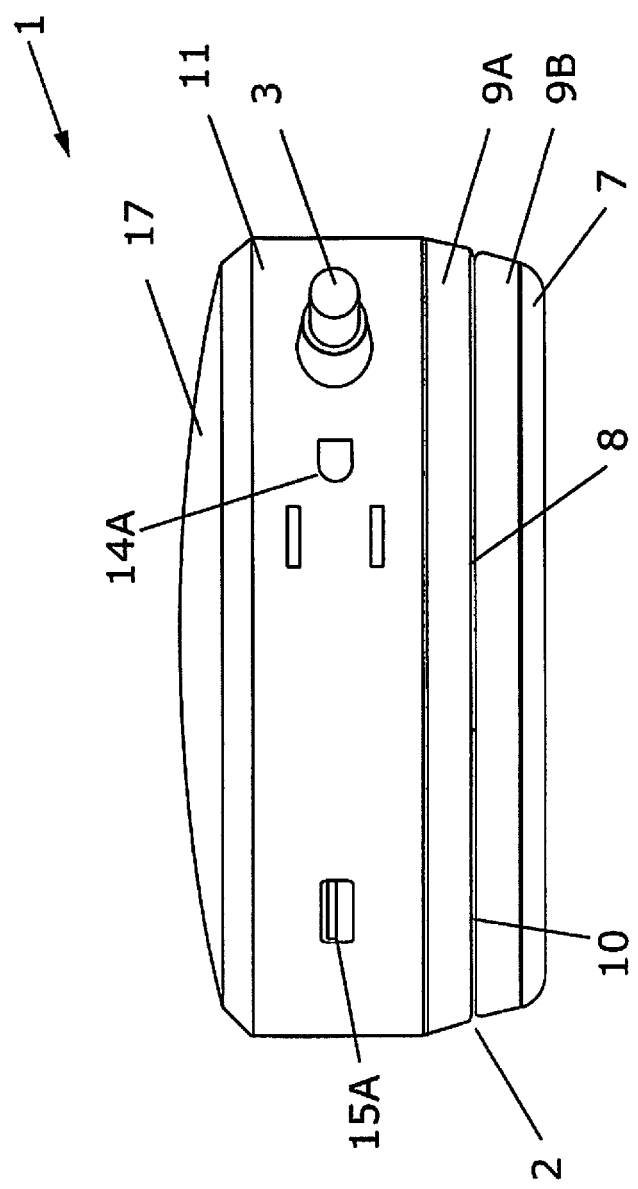
FIG. 2C is an elevated third side view of the first illustrative embodiment of the transportable electrical power supplying device shown in FIGS. 1A, 1B, 2A and 2B, with its extension-type power cord unwound and extended from the housing, its integrated cord storage compartment not being used to store excess power cord associated with electrical appliances, and USB power port and 120 Volt power outlet not being used to supply power to USB-powered devices and 120 Volt-powered devices.
Figure 2D:
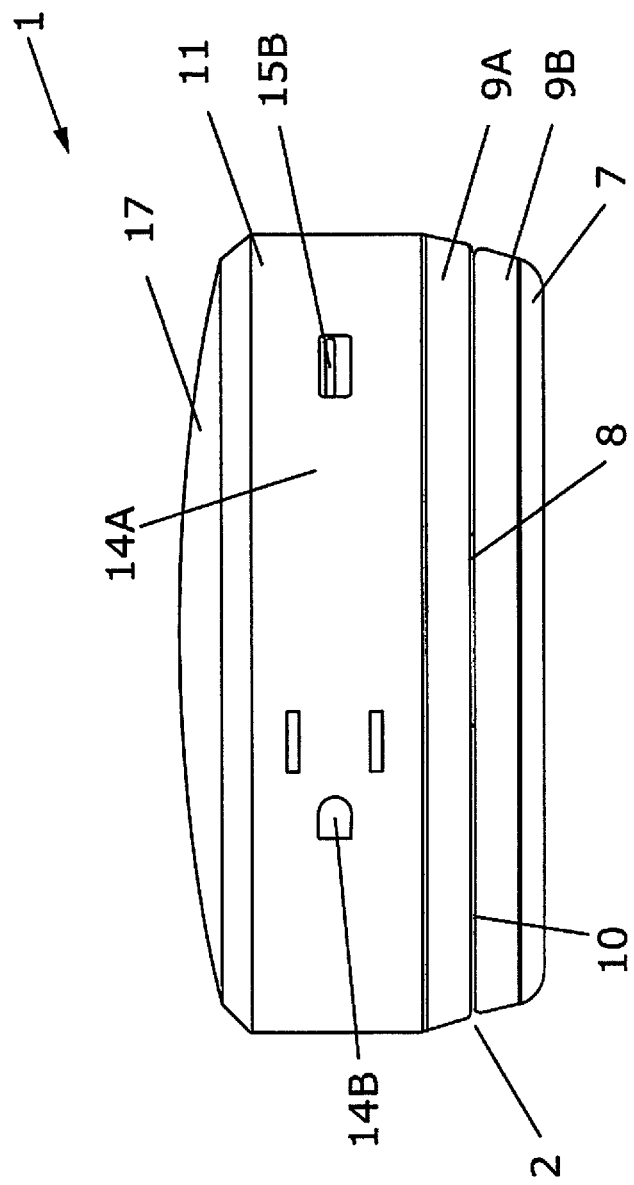
FIG. 2D is an elevated third side view of the first illustrative embodiment of the transportable electrical power supplying device shown in FIGS. 1A, 1B, 2A, 2B and 2C, with its extension-type power cord unwound and extended from the housing, its integrated cord storage compartment not being used to store excess power cord associated with electrical appliances, and USB power port and 120 Volt power outlet not being used to supply power to USB-powered devices and 120 Volt-powered devices.

Alternatively, as shown in FIGS. 2A and 2B, the transportable electrical power supplying device 1 is shown supported on a horizontal surface (e.g. floor surface), and is supplied with electrical power from an external power receptacle 5. In this configuration as well, the device can supply DC and AC electrical power to diverse electrical power consuming appliances (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers, etc.) the through a plurality of power cords, routed through the environment into the device 1.

As shown in FIGS. 1A through 2D, the transportable electrical power supplying device 1 comprises an assembly of components, namely: a lower housing portion 6 supporting an external elastomeric power cord storage compartment 2 above its bottom end portion 7; a power cord storage spool 8 axially positioned within the device and contained within the power cord storage compartment 2 and surrounded by a pair of spaced-part elastomeric discs 9A and 9B forming a perimeter power cord access opening 10, through which a length of power cord can be pushed when wrapping up excess power cord about its power cord storage spool 8 during excess cord windup operations; an upper housing portion 11 snap-fit connected to the top portion of the lower housing portion 6, and having an interior volume 12 containing a printed circuit (PC) board 13 supplying electrical power to 120 Volt AC electrical power receptacles 14A and 14B, and USB DC electrical power receptacles 15A and 15B, mounted through apertures formed through the side walls 11A of the upper housing portion 11; an LED-based power-on indicator light 16 mounted on the PC board 13; and a cover portion 17 for closing off the interior volume 12 of the upper housing portion with the LED-based power-on indicator light 16, illuminating from behind the centrally disposed translucent logo/badge 18 mounted on the cover portion 17.

Figure 4:
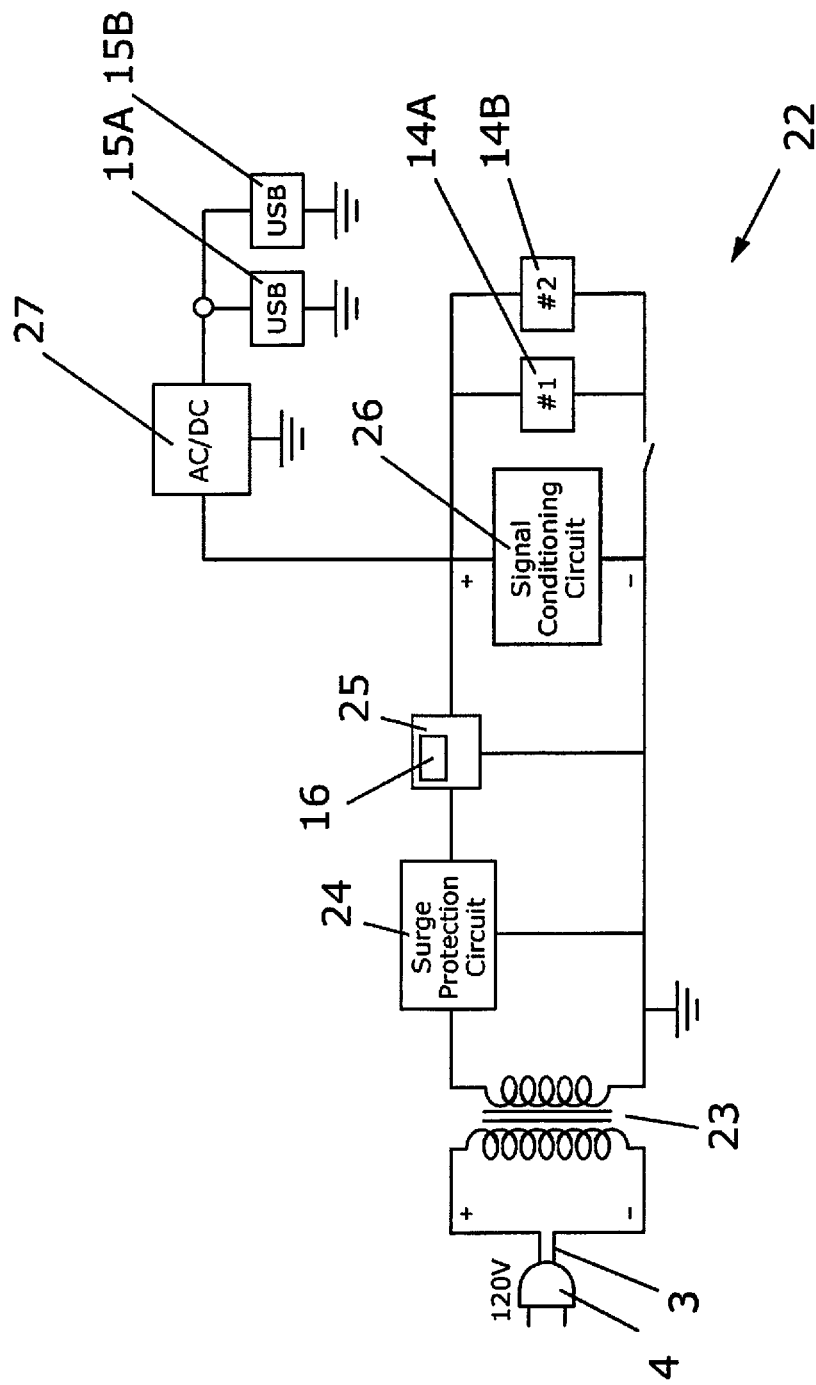
FIG. 4 is a schematic diagram of the electrical and electronic components contained and mounted in the electrical power supplying device shown in FIGS. 1A through 3.

Within the upper housing portion 11, the electrical receptacles 14A, 14B and 15A, 15B electronic circuit board 13 are snap-fit mounted into mounting brackets within the interior of the upper housing portion 11 along with electrical wiring connections among electrical and circuit board components, making the necessary interconnections as specified in FIG. 4.

As shown in FIG. 4, the lower portion 6 of the transportable device 1 supports a connector 19 to which the electrical power cord 4 of the device is connected. The connector 16 is mounted on a small PC board or like structure 20 is also adapted to snap-fit into a mated connector on the underside of PC board 13 and establish electrical connections, with other electrical/electronic components, as shown in FIG. 4, when the upper and lower housing portions are snap-fitted together during assembly. It is understood, however, that other connection arrangements are possible, and in no way do such interconnection limit the principles of the present invention.

Figure 3:
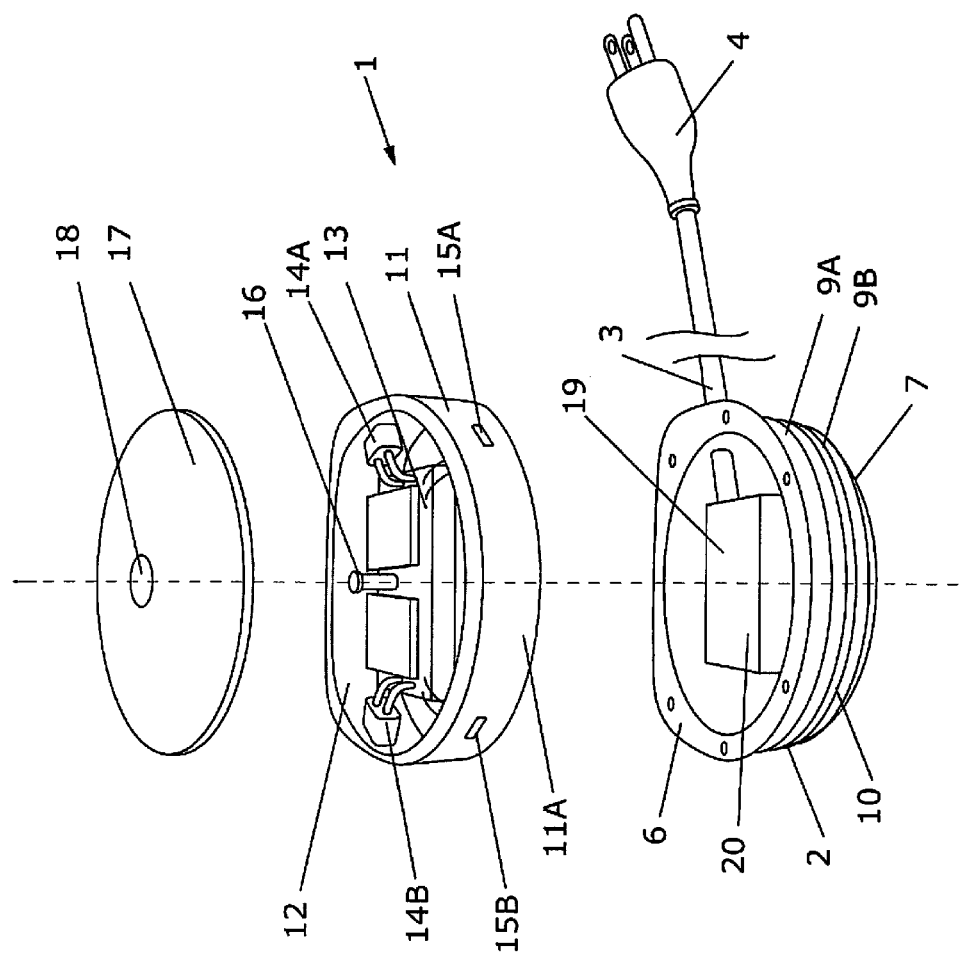
FIG. 3 is an exploded view of the transportable electrical power supplying device shown in FIGS. 1A through 2D, comprising a lower housing portion supporting an external elastomeric power cord storage compartment at its bottom end, a power cord storage spool contained within each power cord storage compartment, an upper housing portion having an interior volume containing a printed circuit (PC) board supplying electrical power to 120 Volt and USB electrical power receptacles mounted through apertures formed through the side walls of the upper housing portion, and an LED-based power-on indicator light, and a cover portion for closing off the interior volume of the upper housing portion with the LED-based power-on indicator light illuminating the centrally disposed logo/badge mounted on the cover portion.

As best shown in the exploded diagram of FIG. 3, the lower housing portion 6 of the transportable device 1 supports the external power cord storage compartment 2 above its bottom end portion, realized as a disc-like structure 7. The power cord storage spool 8 mounted between the lower housing 6 and bottom plate 7 contained deep, with external power cord storage compartment 6 formed therebetween, is capable of supporting a number of turns of power cord about the spool, while the elastomeric discs 9A and 9B, exert opposing forces against contacting surfaces, to retain the wound power cord in place and prevent power cord from unwinding and spilling out through the perimeter access opening 10 and off its spool 8. Only when the wound-up power cord 3 is pulled from its storage compartment 2 with sufficient force, does the elastomeric cord retention discs 9A, 9B (or functionally equivalent structures) elastically deform and allow excess power cord 3 to be removed from the storage compartment 2 and used in supplying power to its associated appliance at some preselected distance from the device 1. In the preferred embodiment, elastomeric cord retention discs 9A, 9B are configured to press against and exert forces upon each other to substantially close off perimeter access opening 10, and completely conceal excess power cord stored therebetween. At the same time, power cord 3 that is not wound up about its power cord spool 8 and concealed behind the spaced-apart elastomeric structures 9A and 9B, is allowed to exit through opening 10 at any point about the transportable device 1, and routed to its respective appliance or device in the workspace being served by the transportable device 1. In other alternative embodiments, the elastomeric cord retention discs 9A, 9B can be configured not press against and exert forces upon each but otherwise substantially close off perimeter access opening 10, and conceal excess power cord therebehind, as described above.

Within the upper housing portion 11 of the transportable device 1, the 120 Volt AC electrical receptacles 14A, 14B, and USB-type DC power receptacles/ports 15A, 15B, and electronic circuit board 13, are snap-fit mounted into mounting brackets within the interior of the upper housing portion 11. Electrical wiring is used within the interior volume to make electrical connections among the electrical and PC board components, as specified in FIG. 4.

As shown in FIG. 4, the electrical and electronic circuitry 22 contained in the structure 11 of the device housing, comprises: the electrical power cord 3 having power plug 4 and a distal end that plugs into connector formed on PC board 20 in lower housing portion; an isolation-type power transformer 23; surge protection circuitry 24 connected to the output terminals of the isolation transformer 23; ON/OFF indicator circuit 25 provided with a glowing LED ring 16, 18 that indicates the ON state of the device; a signal conditioning circuit 26; multiple 120 Volt AC electrical power receptacles 14A, 14B supplied AC electrical power signals from the signal conditioning circuit 26; and AC/DC converter 27 supplying the USB power ports 15A, 15B with DC electrical power signals.

Figure 5:
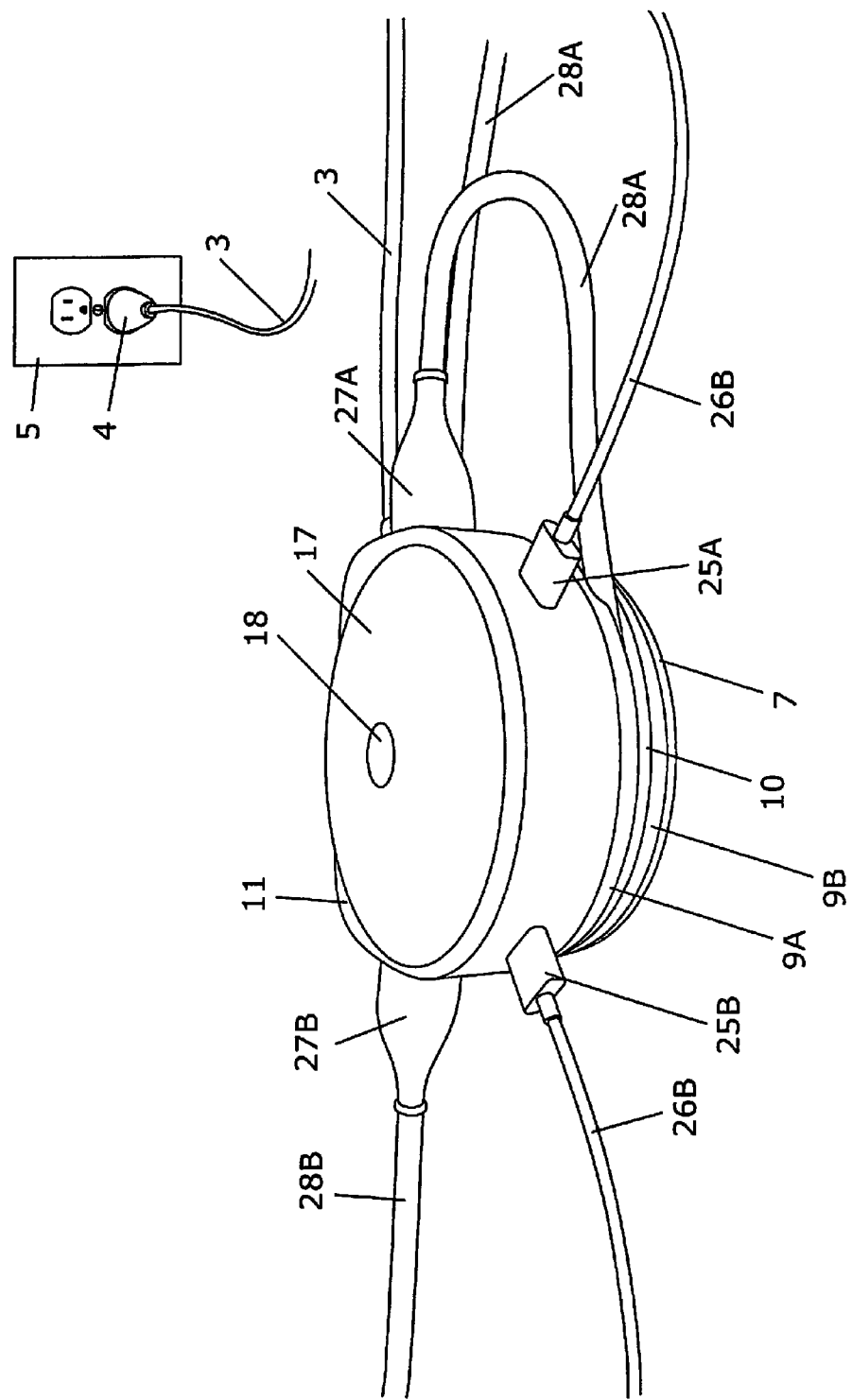
FIG. 5 is a first perspective view of the transportable electrical power supplying device of the first illustrative embodiment, shown in FIGS. 1A through 2D, wherein the USB power cables of two electronic devices are plugged into the USB power ports in the upper housing portion, and two electrical appliance plugs are plugged into the two 120 Volt electrical power receptacles mounted in the upper housing portion, and wherein the excess power cord of one of the electrical appliances is wound up about and concealed within the external power cord compartment disposed between the upper housing portion and the base portion of the device.
Figure 6:
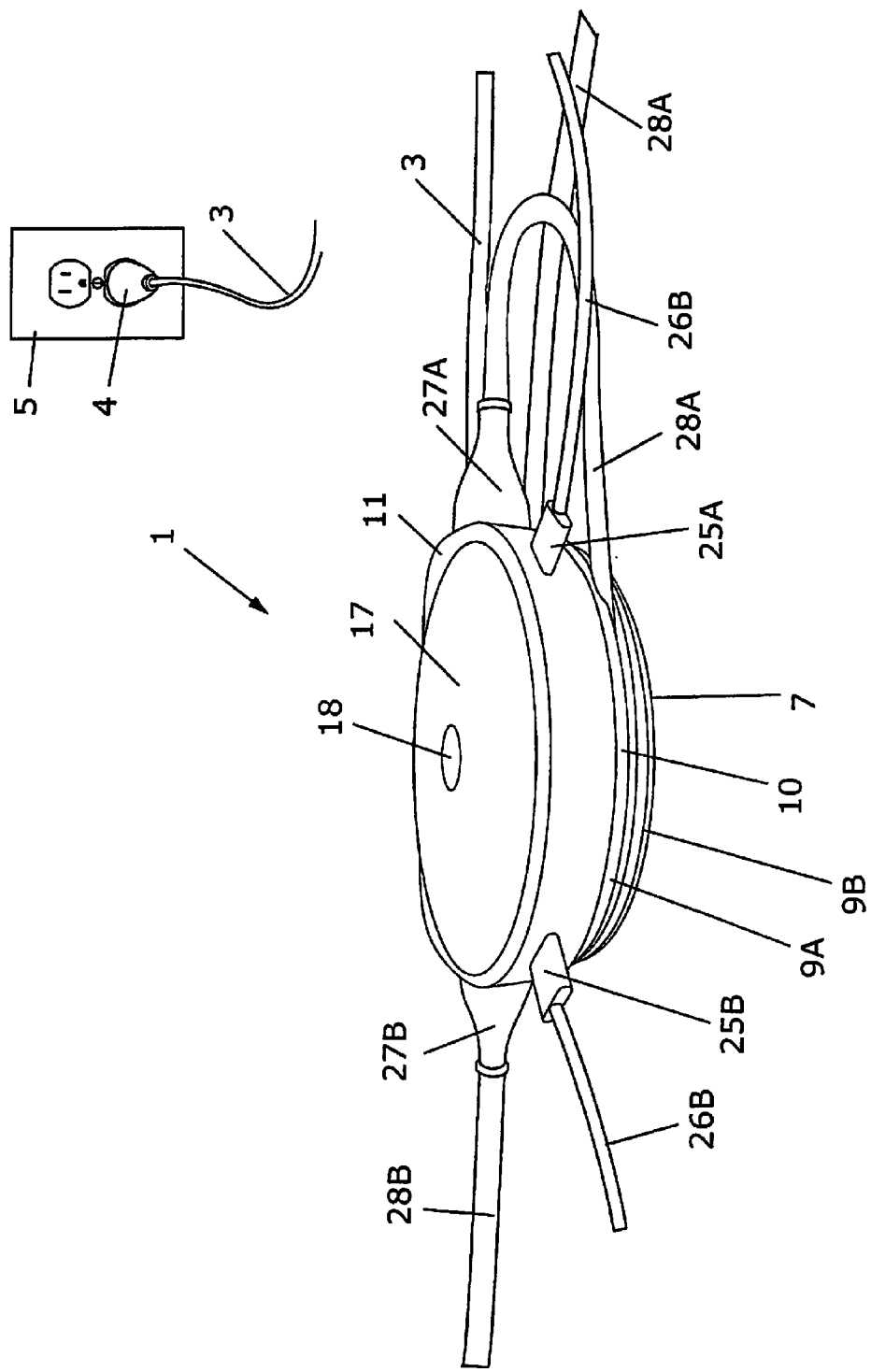
FIG. 6 is a second perspective view of the view of the transportable electrical power supplying device configured as shown in FIG. 5.
Figure 7A:
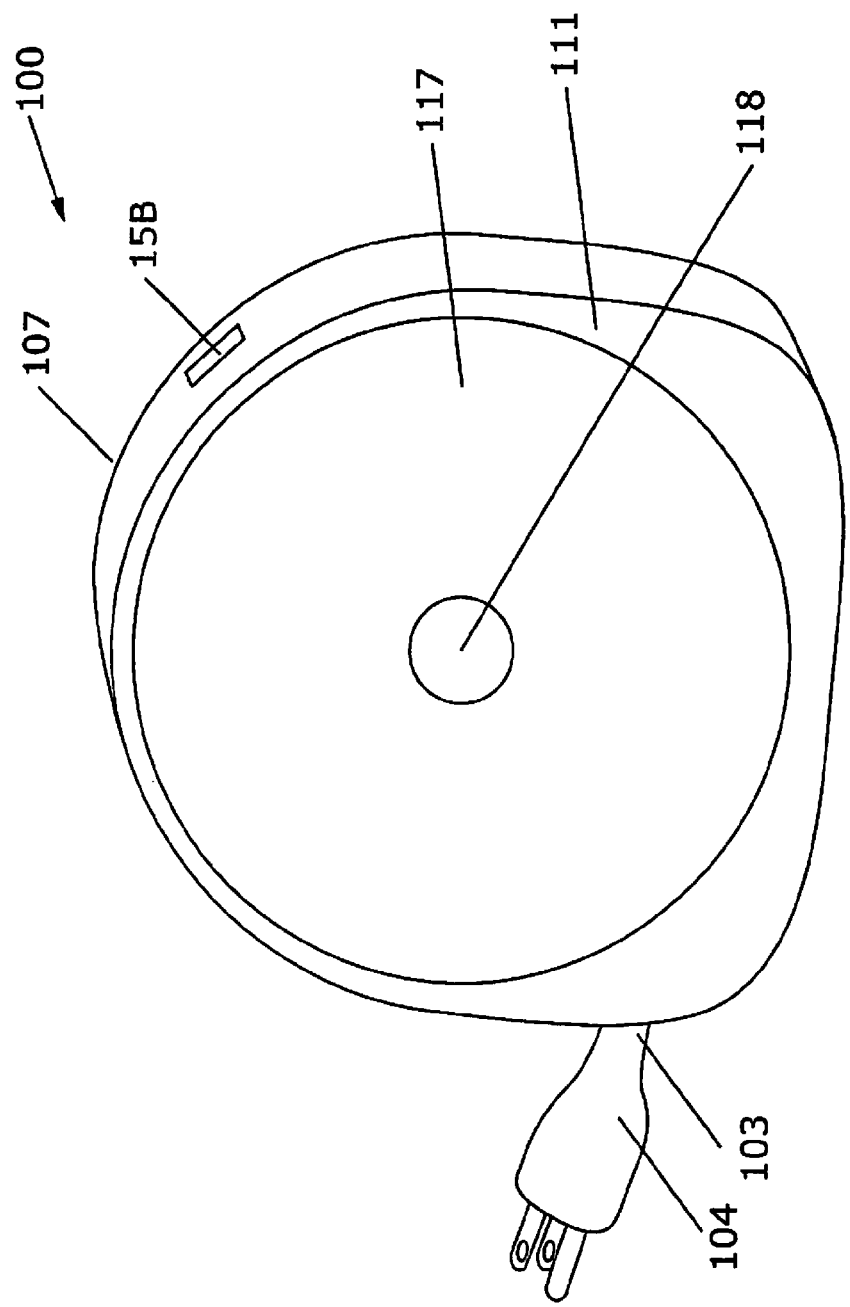
Figure 8A:
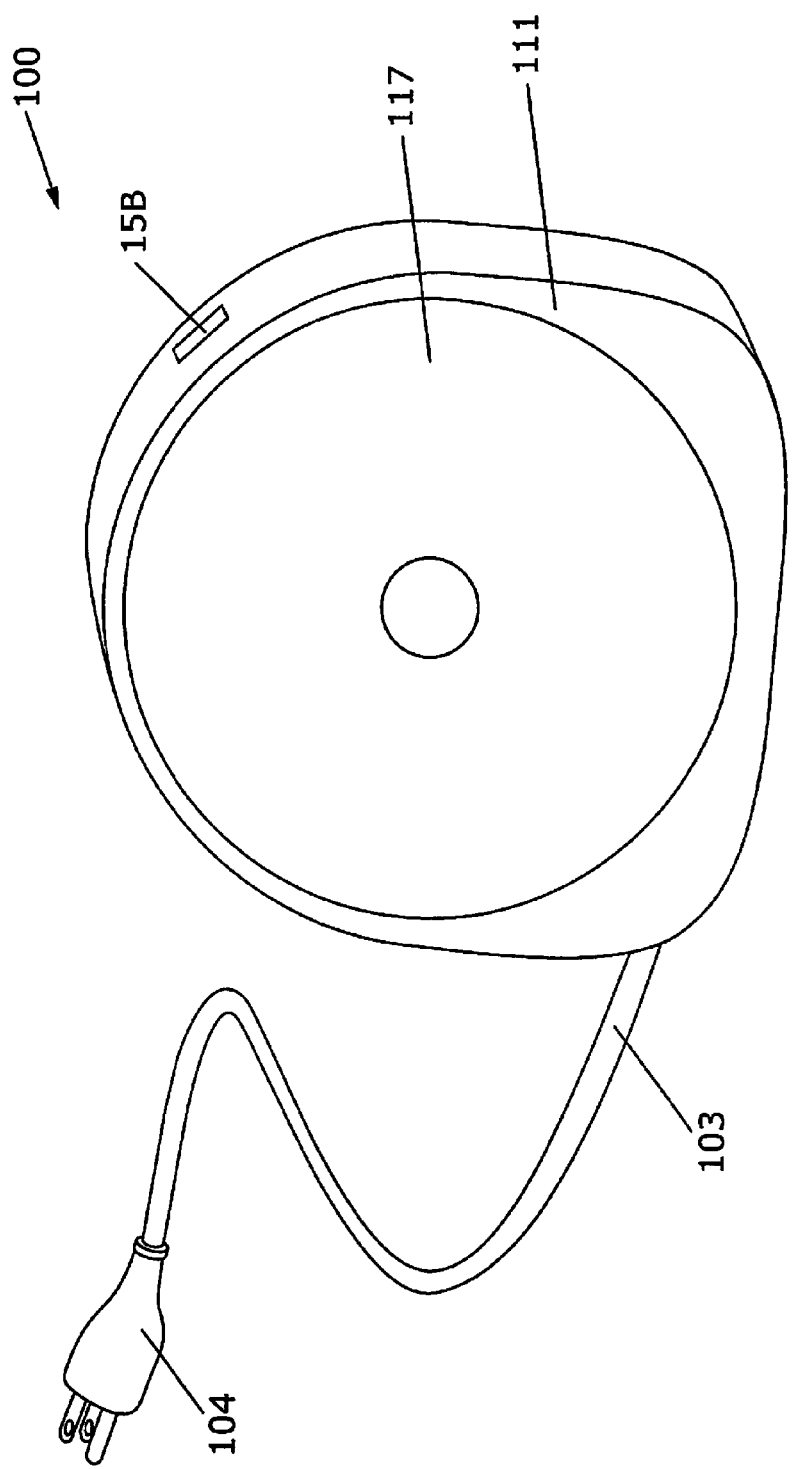
FIG. 8A is an elevated first side view of the second illustrative embodiment of the transportable electrical power supplying device shown in FIGS. 7A and 7B, with its extension-type power cord unwound and extended from the housing, and its dual integrated cord storage compartments not being used to store excess power cord associated with any electrical appliances, and its pair of USB power ports not being used to supply power to any USB-powered devices.

FIGS. 5 and 6 show the electrical power supplying device of FIGS. 1A through 2D, being used in only one of its many use configurations. In particular, the USB power plugs 25 and cords/cables 26 of two electronic devices are plugged into the USB power ports 15A, 15B in the upper housing portion 11, and two electrical appliance plugs 27 and cords/cables 28 of electronic appliances are plugged into the two 120 Volt electrical power receptacles 14A, 14B mounted in the upper housing portion 11. As shown, the excess power cord of one of the electrical appliances is wound up about and concealed within the external power cord compartment 2 disposed between the upper housing portion 11 and the base portion 7 of the device.

The transportable electrical power supplying device of the present invention 1 can be used on any horizontal surface at which one or more users might sit, and on which might be supported a one or more laptop computers, USB-powered iPad appliances and mobile phones etc, each of which can share electrical power from the single electrical power supplying device shown in FIGS. 1A through 4, with power cords wound in a configuration about the storage spool of the external power cord storage compartment of the device. This surface could be the surface of a library desk, a table at a coffee shop, a desktop surface at home or in the office, a deli-counter, a mechanics workbench, or any horizontal surface where two or more people could work, entertain or play together.

The Transportable Electrical Power Supplying Device According to a Second Illustrative Embodiment of the Present Invention In FIGS. 7A through 8B, the transportable power supplying device 100 of the present invention is supported vertically on a surface and is supplied with electrical power through a flexible extension power cord 103 whose electrical plug 104 is plugged in a standard electrical power receptacle 5. As shown, a number of different AC and/or DC electrical power consuming Appliances and devices (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers) can be powered by the device the through a plurality of power cords, routed through the environment into the device 100. The device 100 powered up when plugging the device into a 120 Volt AC power outlet, causing the ON-OFF indicator 116, 118 on the housing cover 111 to illuminate.

Figure 9A:
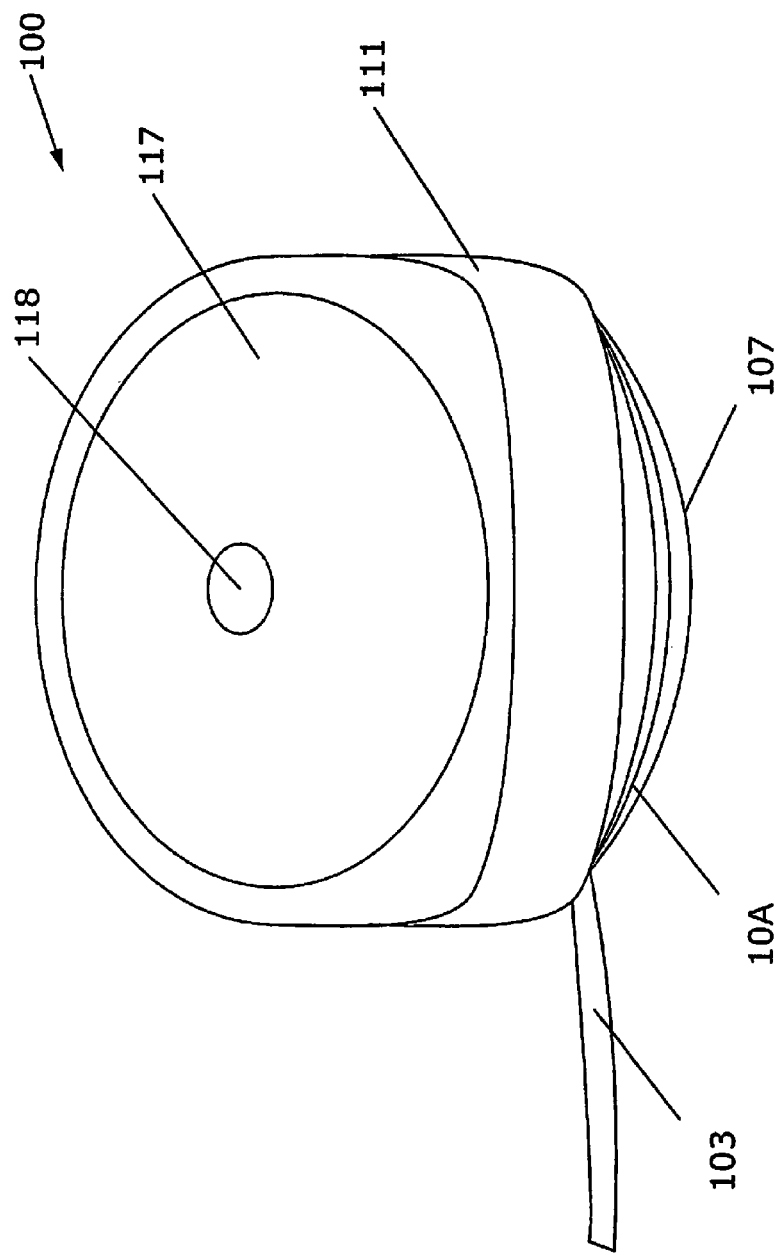
FIG. 9A is a perspective view of the second illustrative embodiment of the transportable electrical power supplying device shown in FIGS. 7A, 7B, 8A and 8B, with its extension-type power cord unwound and extended from the housing, its dual integrated cord storage compartments not being used to store excess power cord associated with any electrical appliances, and its USB power ports and 120 Volt power outlets not being used to supply power to any electrical appliances or electronic devices.
Figure 9B:
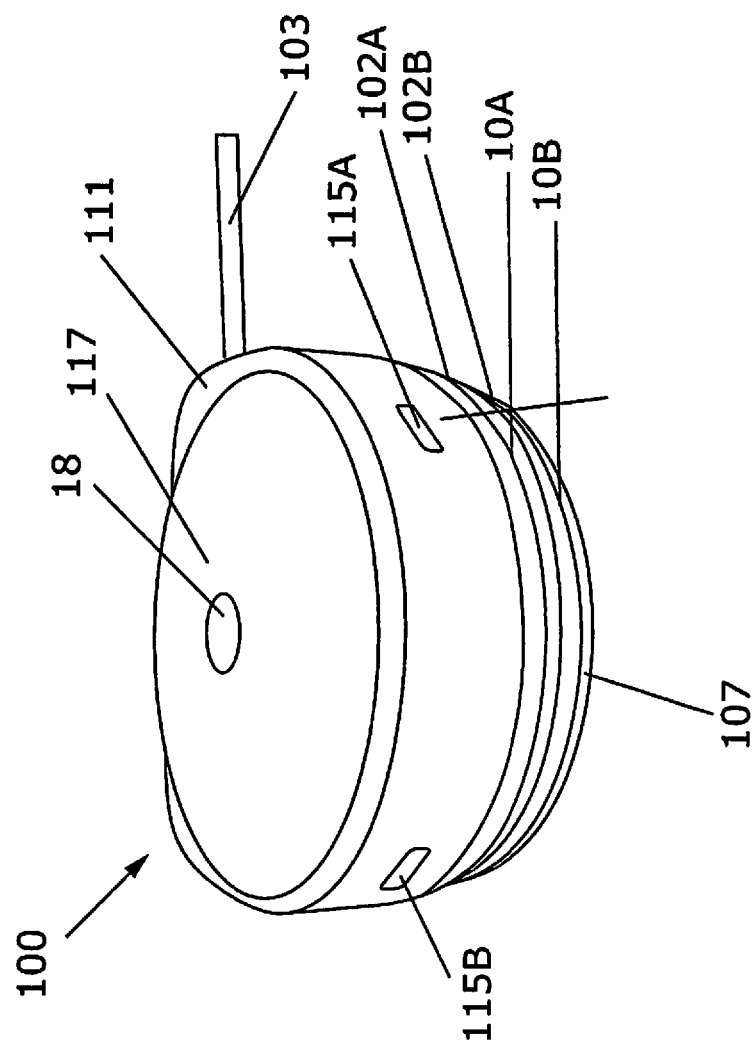
FIG. 9B is a perspective view of the second illustrative embodiment of the transportable electrical power supplying device of FIGS. 7A, 7B, 8A, 8B and 9A, showing its USB-power ports, and with its extension-type power cord unwound and extended from the housing, its dual integrated cord storage compartments not being used to store excess power cord associated with electrical appliances, and its USB power ports and 120 Volt power outlets not being used to supply power to any electrical appliances or electronic devices.
Figure 9C:
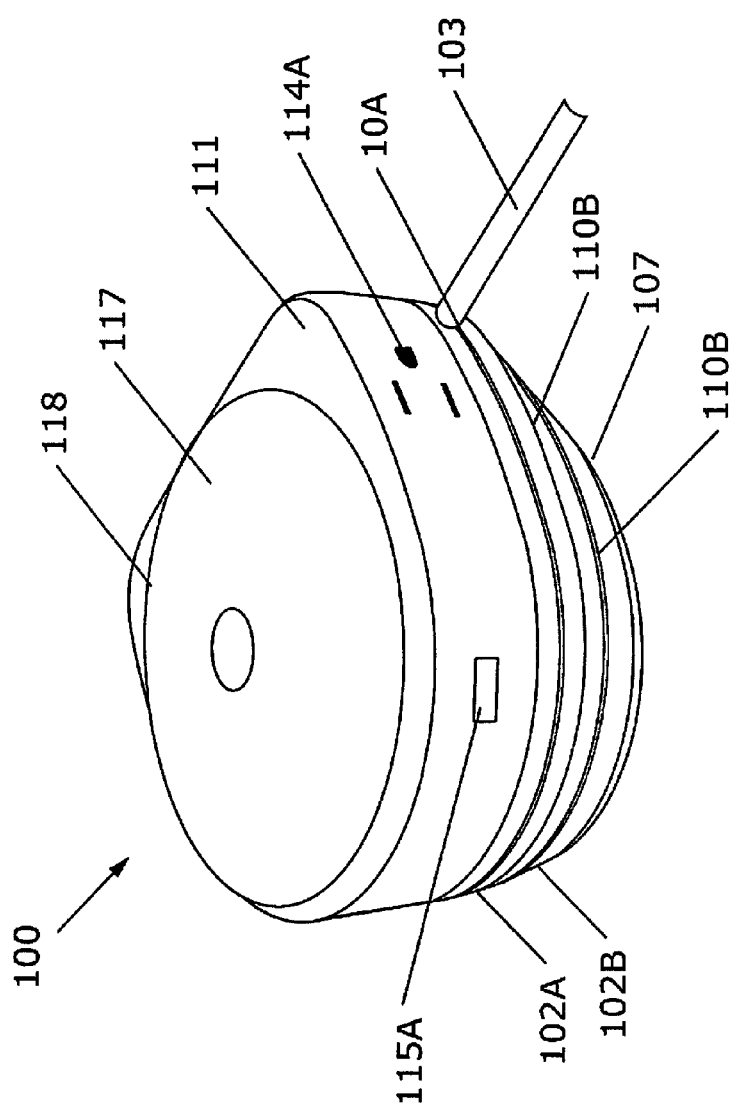
FIG. 9C is a perspective view of the second illustrative embodiment of the transportable electrical power supplying device of FIGS. 7A, 7B, 8A, 8B and 9A, showing a USB-power port and 120 Volt power port, and with its extension-type power cord unwound and extended from the housing, its dual integrated cord storage compartments not being used to store excess power cord associated with electrical appliances, and its USB power ports and 120 Volt power outlets not being used to supply power to any electrical appliances or electronic devices.
Figure 10:
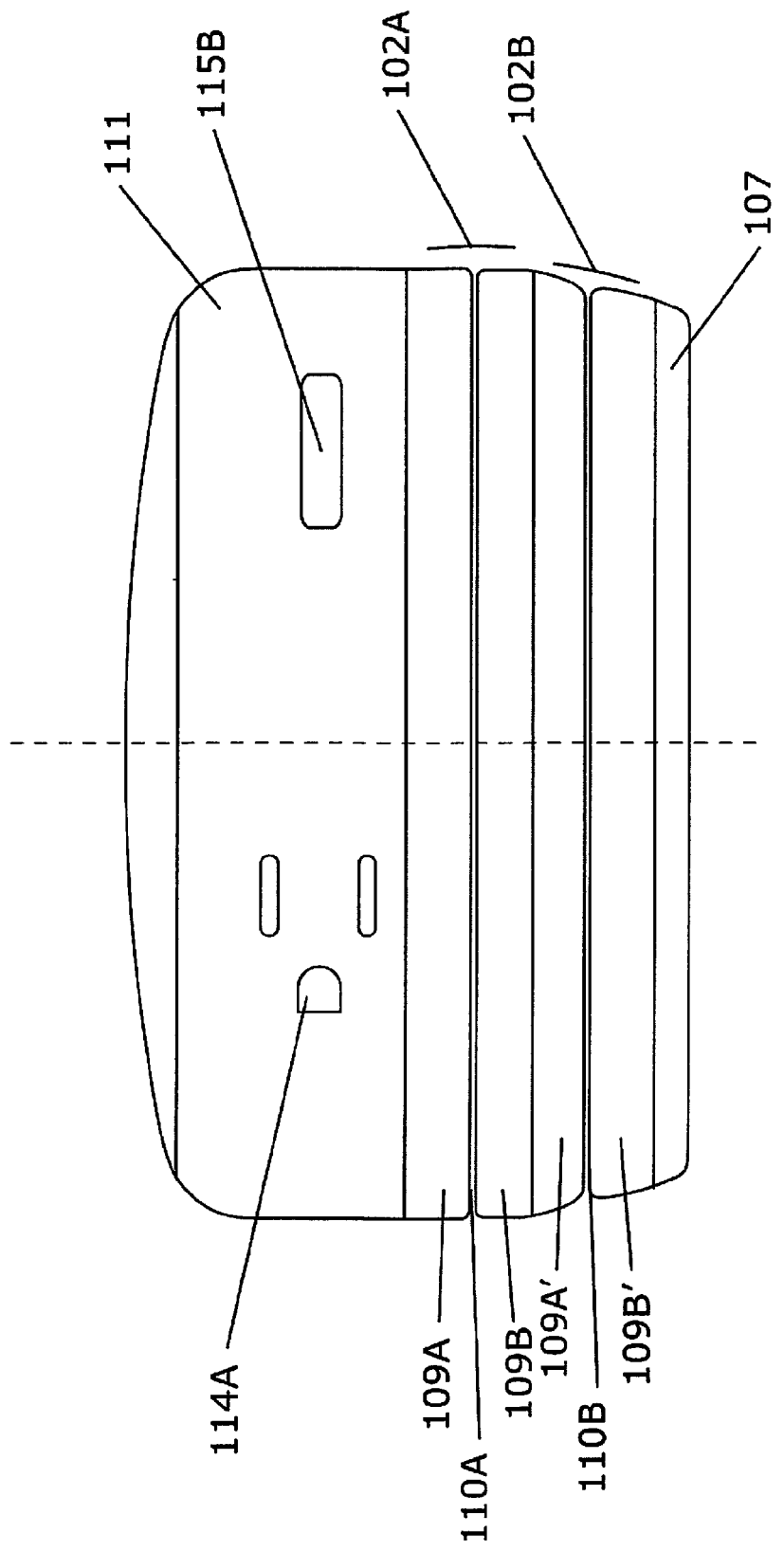
FIG. 10 is an elevated side view of the second illustrative embodiment of the transportable electrical power supplying device of FIGS. 7A, 7B, 8A, 8B through 9C, showing a USB-power port and 120 Volt power port, and its dual integrated cord storage compartments not being used to store excess power cord associated with electrical appliances.

Alternatively, as shown in FIGS. 9A and 9B, the transportable electrical power supplying device 100 is shown supported on a horizontal surface (e.g. floor surface), and is supplied with electrical power from an external power receptacle 5. In this configuration as well, the device can supply DC and AC electrical power to diverse electrical power consuming appliances (e.g. LCD, WIFI power-hub, backup hard-drive, printer, and computer CPU) through a plurality of power cords, routed through the environment into the device 100.

As shown in FIGS. 7A through 12, the transportable electrical power supplying device 100 comprises an assembly of components, namely: a lower housing portion 106 supporting a set of dual external elastomeric power cord storage compartments 102A and 102B located between upper housing portion 111 and disc-like bottom end portion 107; a first power cord storage spool 108A axially positioned within first power cord storage compartment 102A and surrounded by a first pair of spaced-part elastomeric discs 109A and 109B forming a first perimeter power cord access opening 110A, through which a length of power cord can be pushed when wrapping up excess power cord about the first power cord storage spool 108A during excess cord windup operations; a second power cord storage spool 108A axially positioned within second power cord storage compartment 102A and surrounded by a second pair of spaced-part elastomeric discs 109A and 109B forming a second perimeter power cord access opening 110A, through which a length of power cord can be pushed when wrapping up excess power cord about the second power cord storage spool 108A during excess cord windup operations; an upper housing portion 111, snap-fit connected to the top portion of the lower housing portion 106, and having an interior volume 112 containing a printed circuit (PC) board 113 supplying electrical power to 120 Volt AC electrical power receptacles 114A, 114B and USB-type DC electrical power receptacles 115A, 115B, mounted through apertures formed through the side walls 111A of the upper housing portion 111; and an LED-based power-on indicator light 116 mounted on the PC board 113; a cover portion 117 for closing off the interior volume 112 of the upper housing portion 111; and LED-based power-on indicator light 116 illuminating from behind the centrally disposed translucent logo/badge 118 mounted on the cover portion 117.

Within the upper housing portion 111 of the transportable device 100, the 120 Volt electrical receptacles 114A, 114B and USB power ports 115A, 115B and electronic circuit board 113 are snap-fit mounted into mounting brackets within the interior of the upper housing portion 111. Electrical wiring is used within the interior volume to make electrical connections among the electrical and PC board components, as specified in FIG. 12.

Figure 11:
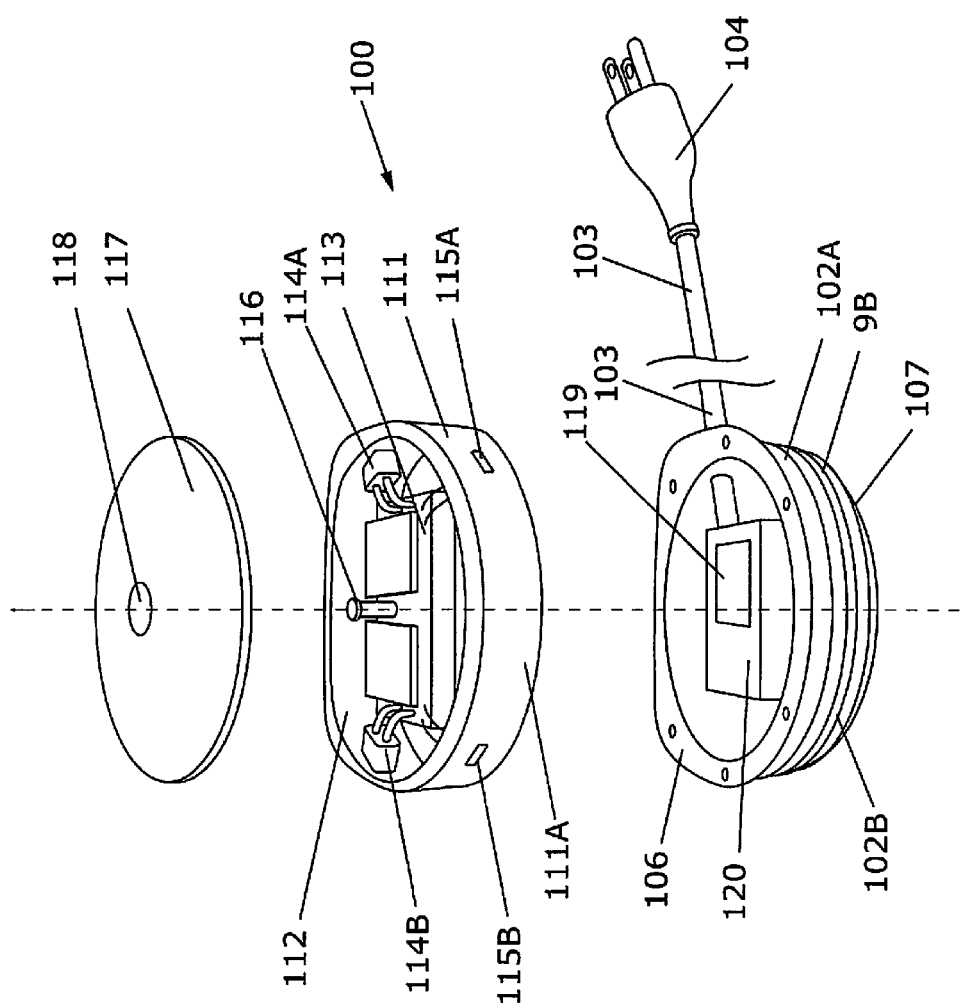
FIG. 11 is an exploded view of the transportable electrical power supplying device shown in FIGS. 7A through 11, comprising a lower housing portion supporting a set of dual external elastomeric power cord storage compartments above its bottom end, a power cord storage spool contained within each power cord storage compartment, an upper housing portion having an interior volume containing a printed circuit (PC) board supplying electrical power to 120 Volt AC electrical receptacles and USB-type DC electrical power ports mounted through apertures formed through the side walls of the upper housing portion, and a cover portion for closing off the interior volume of the upper housing portion with a LED-based power-on indicator light illuminating the centrally disposed logo/badge mounted on the cover portion.
Figure 12:
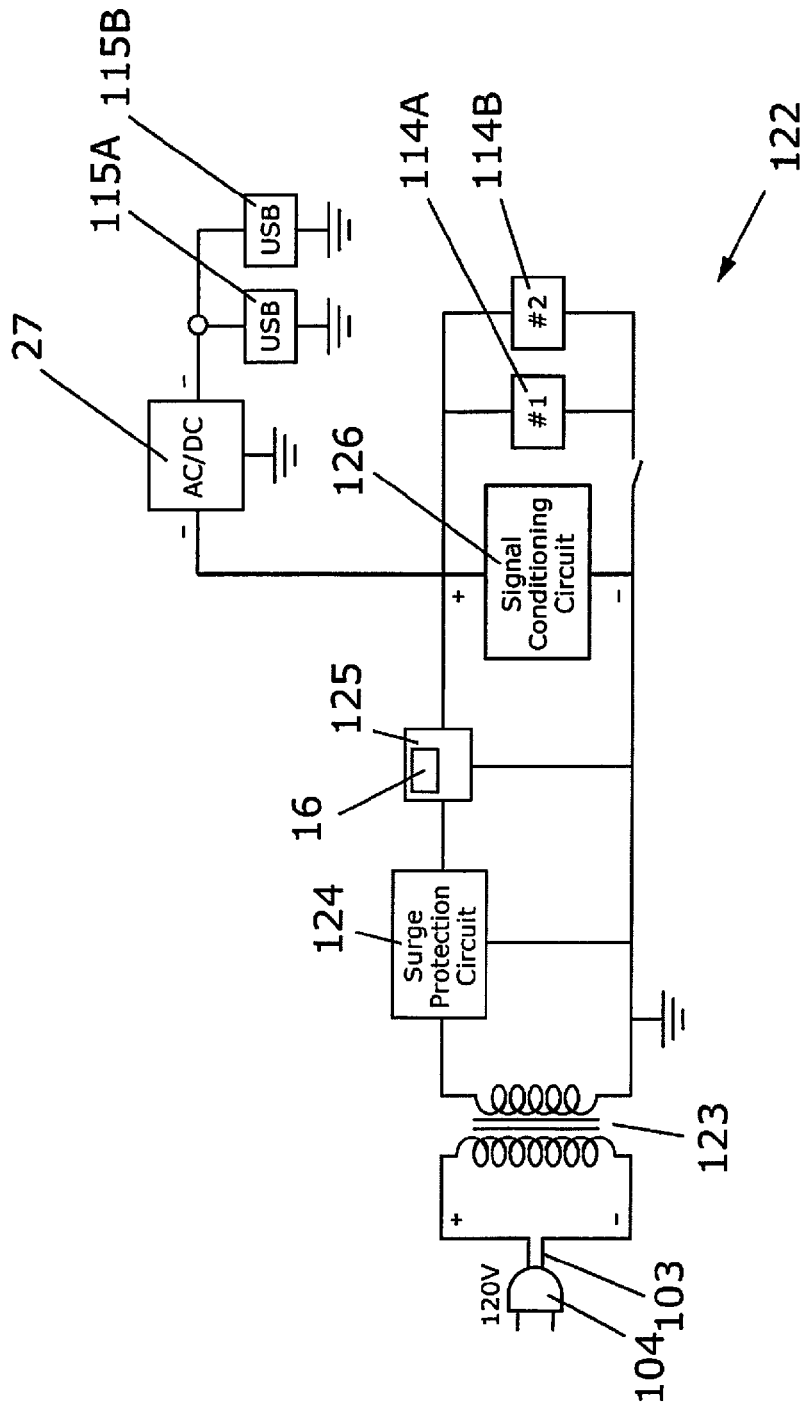
FIG. 12 is a schematic diagram of the electrical and electronic components contained and mounted in the electrical power supplying device shown in FIGS. 7A through 10.

As shown in FIG. 11, the lower portion 106 of the transportable device 100 supports a connector 119 to which the electrical power cord 103 of the device is connected. The connector 119 is supported on a small PC board or like structure 120, is also adapted to snap-fit into a mated connector on the underside of PC board 113 and establish electrical connections, with other electrical/electronic components, as shown in FIG. 11, when the upper and lower housing portions 111 and 106 are snap-fitted together during assembly. It is understood, however, that other connection arrangements are possible, and in no way do such interconnection limit the principles of the present invention.

As best shown in the exploded diagram of FIG. 11, the lower housing portion 106 supports the set of dual external elastomeric power cord storage compartments 102A and 102B above its disc-like bottom end portion 107. Within the first external power cord storage compartment 102A, a first power cord storage spool 108A is contained deep therein with a first pair of elastomeric discs 109A and 109B mounted at the perimeter of the storage compartment 102A to retain the wound power cord in place and prevent power cord from unwinding and spilling out through the access opening 110A and off its spool 108A. Also, within the second external power cord storage compartment 102B, a second power cord storage spool 108B is contained deep therein with a second pair of elastomeric discs 109A' and 109B' mounted at the perimeter of the storage compartment 102B to retain the wound power cord in place and prevent power cord from unwinding and spilling out through the access opening 110B and off its spool 108B. Only when the wound-up power cord is pulled from its storage compartment with sufficient force, does the cord retention discs 109A, 109B (109A', 109B'), or functionally equivalent structures, elastically deform and allow excess power cord to be removed from the storage compartment and used in supplying power to its associated appliance at some preselected distance from the device 100. In the preferred embodiment, elastomeric cord retention discs 109A, 109B (109A', 109B') in each power cord storage compartment 102A, 102B are configured to press against and exert forces upon each other to substantially close off perimeter access opening 110A, 110B, and completely conceal excess power cord stored therebetween. At the same time, power cord 103 that is not wound up about its power cord spool 108A, 108B and concealed behind the spaced-apart elastomeric structures 109A and 109B (109A', 109B'), is allowed to exit through opening 110A, 110B at any point about the transportable device 100, and routed to its respective appliance or device in the workspace being served by the transportable device 100. In other alternative embodiments, the elastomeric cord retention discs 9A, 9B can be configured not press against and exert forces upon each but otherwise substantially close off perimeter access opening 110, and conceal excess power cord therebehind, as described above.

Within the upper housing portion 111, the electrical receptacles 114A 115B, 115A, 115B and electronic circuit board 113 are snap-fit mounted into mounting brackets within the interior of the upper housing portion 111 along with electrical wiring connections among electrical and circuit board components, making the necessary interconnections as specified in FIG. 11.

As shown in FIG. 11, the electrical and electronic circuitry 122 contained in the upper housing structure 111 of the device housing, comprises: the electrical power cord 103 having power plug 104 and a distal end that plugs into connector 119 formed on PC board 120 in the lower housing portion 106; an isolation-type power transformer 123, surge protection circuitry 124 connected to the output terminals of the isolation transformer 123; ON/OFF indicator circuit 125 provided with a glowing LED ring 116, 118 that indicates the ON state of the device; a signal conditioning circuit 126; multiple 120 Volt AC electrical power receptacles 114A, 114B supplied AC power signals from the signal conditioning circuit 126; and AC/DC converter 127 supplying the USB-type DC power ports 115A, 115B with DC electrical power signals.

Figure 13:
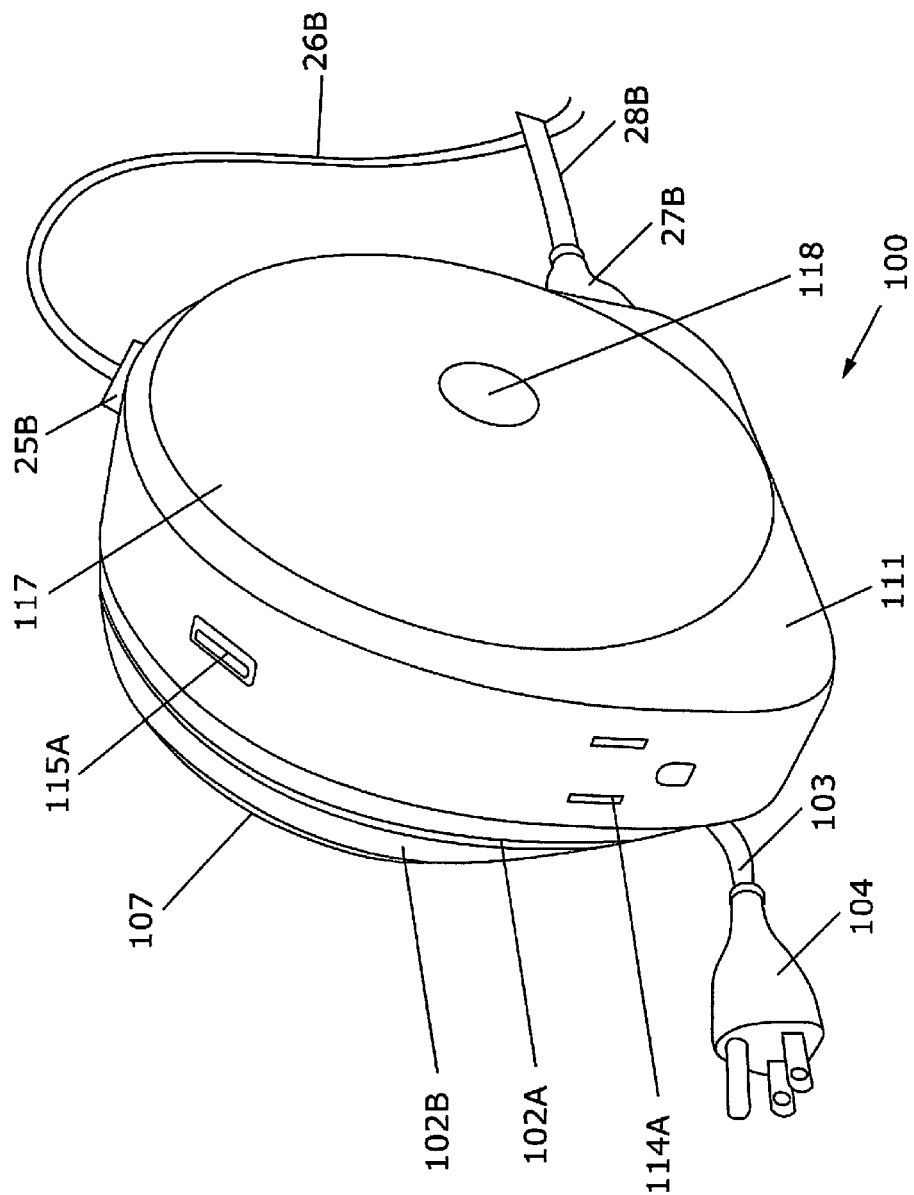
FIG. 13 is a perspective view of the transportable electrical power supplying device of the second illustrative embodiment, shown in FIGS. 7A through 12, wherein the USB power cable of one electronic device is plugged into one of the USB power ports in the upper housing portion, and one electrical appliance plug is plugged into one of the 120 Volt electrical power receptacles mounted in the upper housing portion, and wherein the excess power cord of the power extension cord is wound up about and concealed within the upper external power cord compartment disposed between the upper housing portion and the base portion of the device.
Figure 14A:
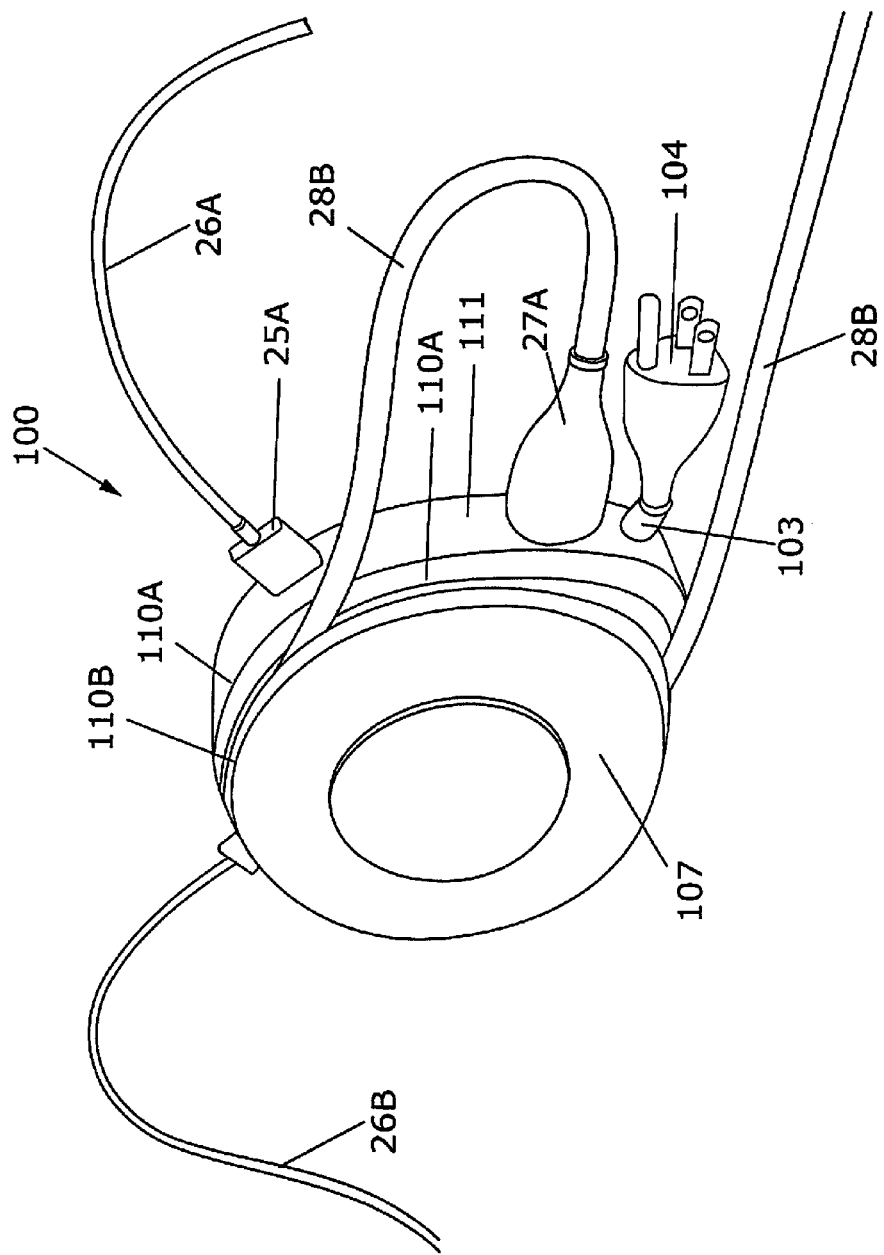
FIG. 14A is a perspective view of the transportable electrical power supplying device of the second illustrative embodiment, shown in FIGS. 7A through 12, wherein the device is vertically mounted on its flat side, wherein the USB power cables of two electronic devices are plugged into the paid of USB power ports in the upper housing portion, and two electrical appliance plugs are plugged into the pair of 120 Volt electrical power receptacles mounted in the upper housing portion, and wherein the excess power cord of the power extension cord is wound up about and concealed within the first external power cord compartment disposed between the upper housing portion and the base portion of the device, and one of the appliance power cords is partially wound up about the second external power cord storage compartment and directed to its associated electrical appliance.
Figure 14B:
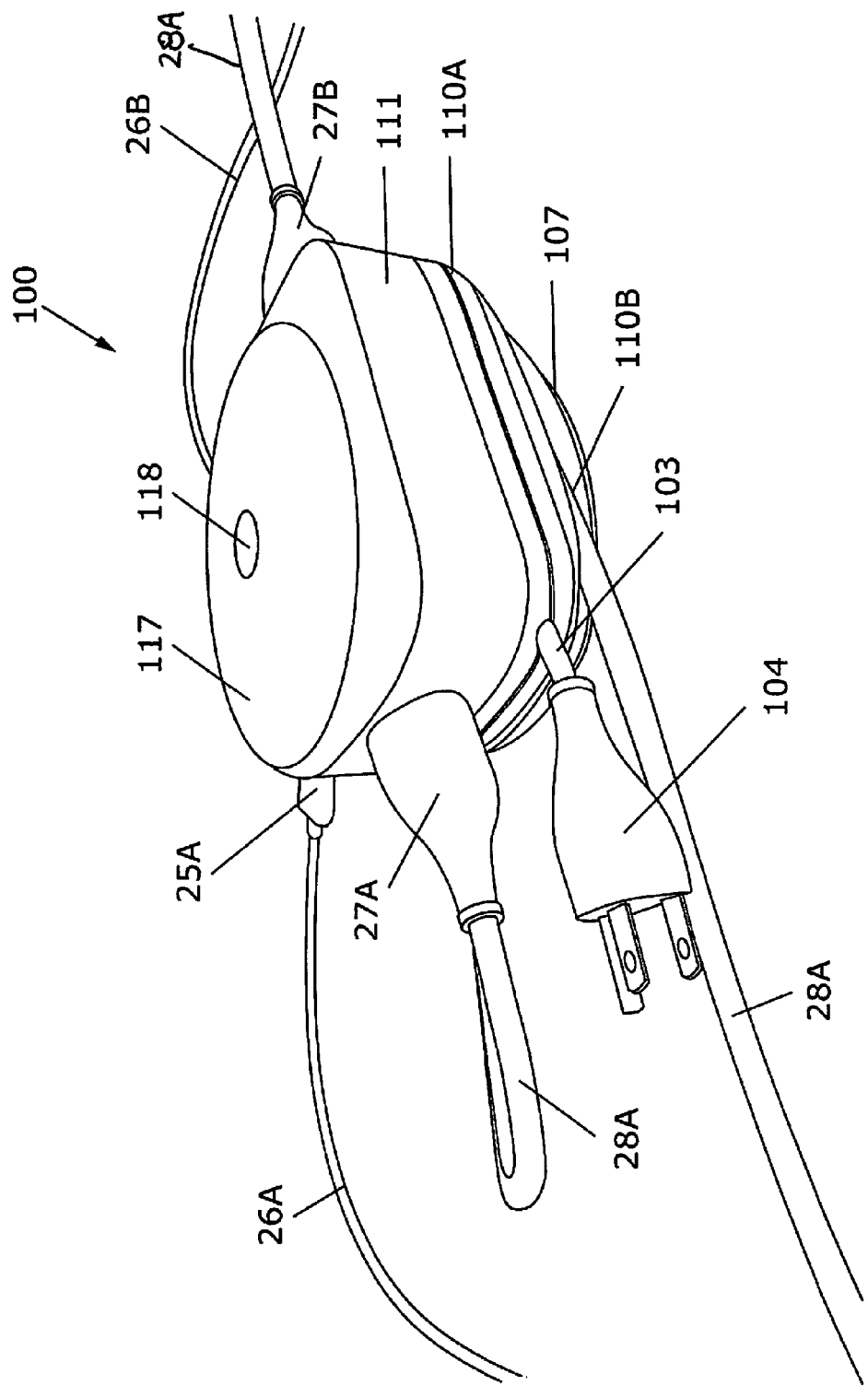
FIG. 14B is a perspective view of the transportable electrical power supplying device of the second illustrative embodiment, shown in FIGS. 7A through 12, wherein the device is horizontally mounted in its base portion, wherein the USB power cables of two electronic devices are plugged into the paid of USB power ports in the upper housing portion, and two electrical appliance plugs are plugged into the pair of 120 Volt electrical power receptacles mounted in the upper housing portion, and wherein the excess power cord of the power extension cord is wound up about and concealed within the first external power cord compartment disposed between the upper housing portion and the base portion of the device, and one of the appliance power cords is partially wound up about the second external power cord storage compartment and directed to its associated electrical appliance.
Figure 14C:
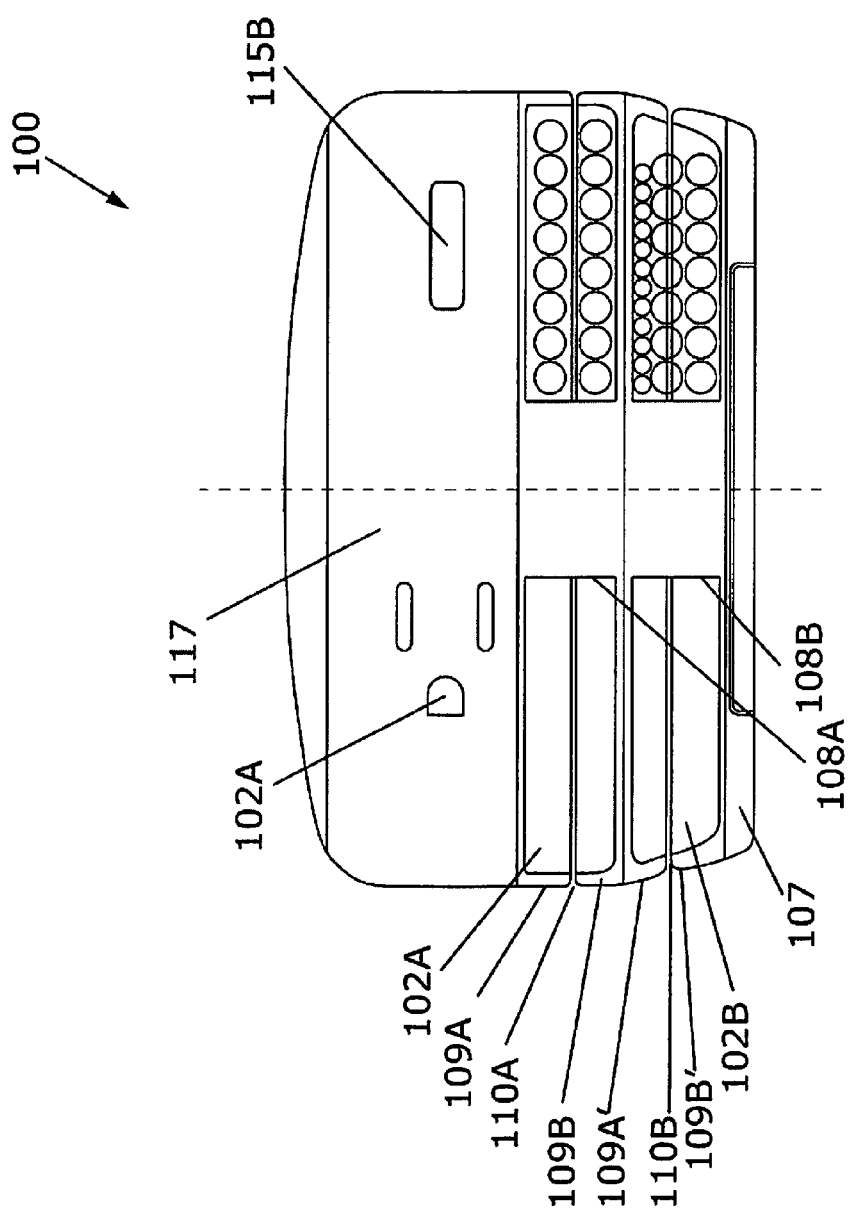
FIG. 14C is an elevated partially cross-sectional view of the transportable electrical power supplying device of the second illustrative embodiment of FIGS. 14A and 14B, showing dual power cord storage compartments in cross-sectional view, and the cables that are wound up and stored therein.
Figure 15:
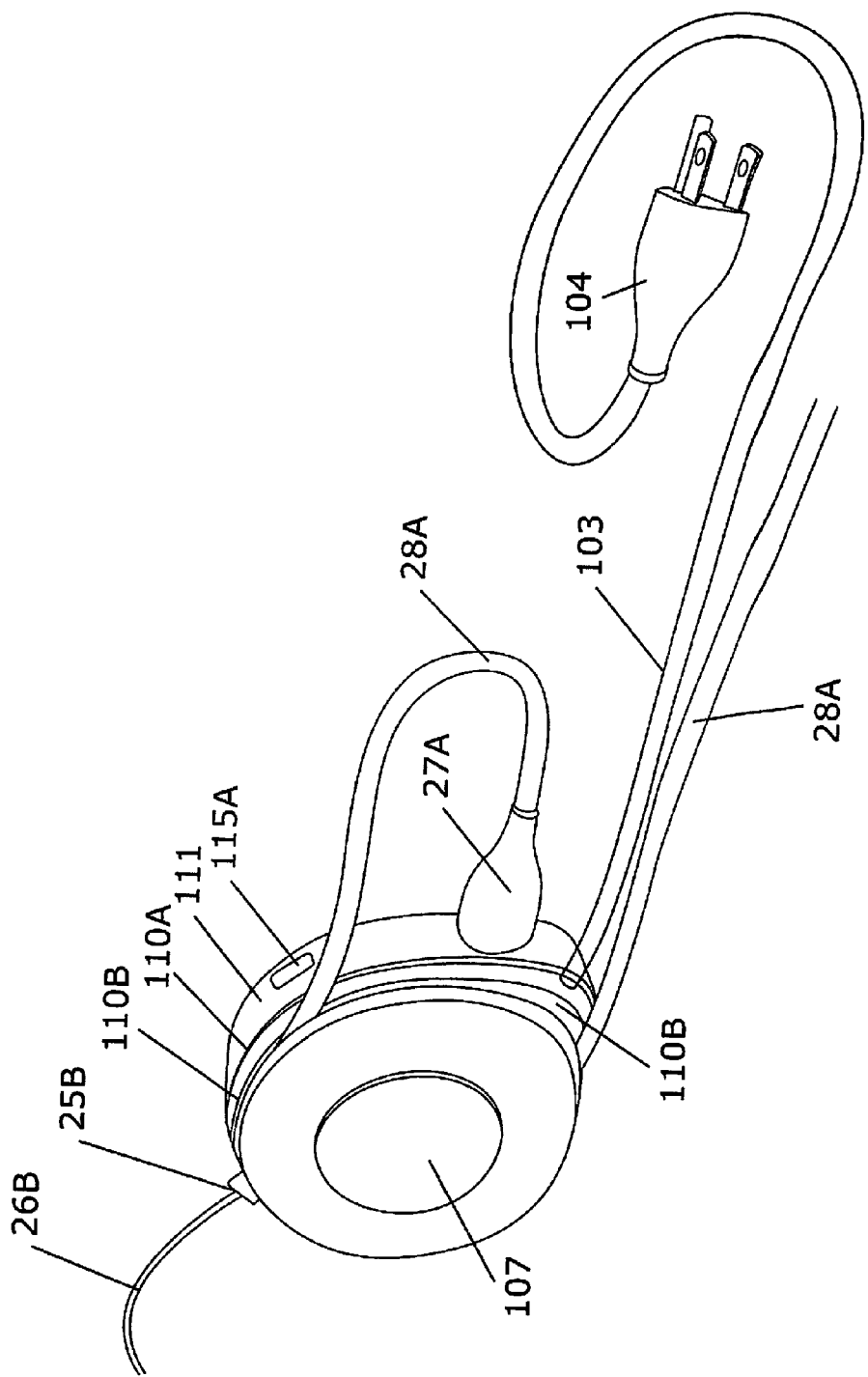
FIG. 15 is a perspective view of the transportable electrical power supplying device of the second illustrative embodiment, shown in FIGS. 7A through 12, wherein the device is vertically mounted on its flat side portion, wherein one USB power cable of one electronic device is plugged into one of USB power ports in the upper housing portion, and one electrical appliance plug is plugged into one of 120 Volt electrical power receptacles mounted in the upper housing portion, and wherein the power extension cord is unwound and released from within the first external power cord compartment, and one of the appliance power cords is partially wound up about the second external power cord storage compartment and directed to its associated electrical appliance.

In FIGS. 13 through 15, a number of use cases are illustrated for the electrical power supplying devices of the present invention 100.

As shown in FIG. 13, the USB power port 115B of the electrical power supplying device 100 is used to supply DC power signals to one electronic device, while a 120 Volt electrical power receptacle 114B of the electrical power supplying device 100 is used to supply AC electrical power signals to an electrical appliance. As shown, the excess length of the power extension cord 103 is wound up about and concealed within the upper external power cord compartment 102A disposed between the upper housing portion 111 and the base portion 107 of the device.

As shown in FIGS. 14A and 14B, the USB power ports 115A, 115B of the electrical power supplying device 100 are used to supply DC power signals to a pair of electronic devices via USB plugs 25 and cords 26, and the pair of 120 Volt electrical power receptacles 114A, 114B of the electrical power supplying device 100 provide AC electrical power to a pair of electronic appliances via AC power plug 27 and cord 28. As shown, the excess power cord of the extension power extension cord 103 is wound up about and concealed within the first external power cord compartment 102A disposed between the upper housing portion and the base portion of the device, and one of the appliance power cords 28B is partially wound up about the second external power cord storage compartment 102B and directed to its associated electrical appliance. FIG. 14C shows the power cords wound up about the power cord spools 108A and 108B within the dual power cord storage compartments 102A and 102B, respectively. Note that even excess USB power cord can be wound up around the power cord spools.

As shown in FIG. 15, one of the USB power ports 115B of the electrical power supplying device 100 is used to supply DC power signals to an electronic devices, while the pair of 120 Volt electrical power receptacles 114A, 114B of the electrical power supplying device 100 provide AC electrical power to a pair of electronic appliances via respective AC power plug 27 and cord 27. As shown, the power extension cord 103 is unwound and released from within the first external power cord compartment 102A, but is not plugged into an AC power receptacle 5. Also, any of the appliance power cords can be partially wound up about the second external power cord storage compartment and directed to its associated electrical appliance or electronic device, as required.

Figure 16A:
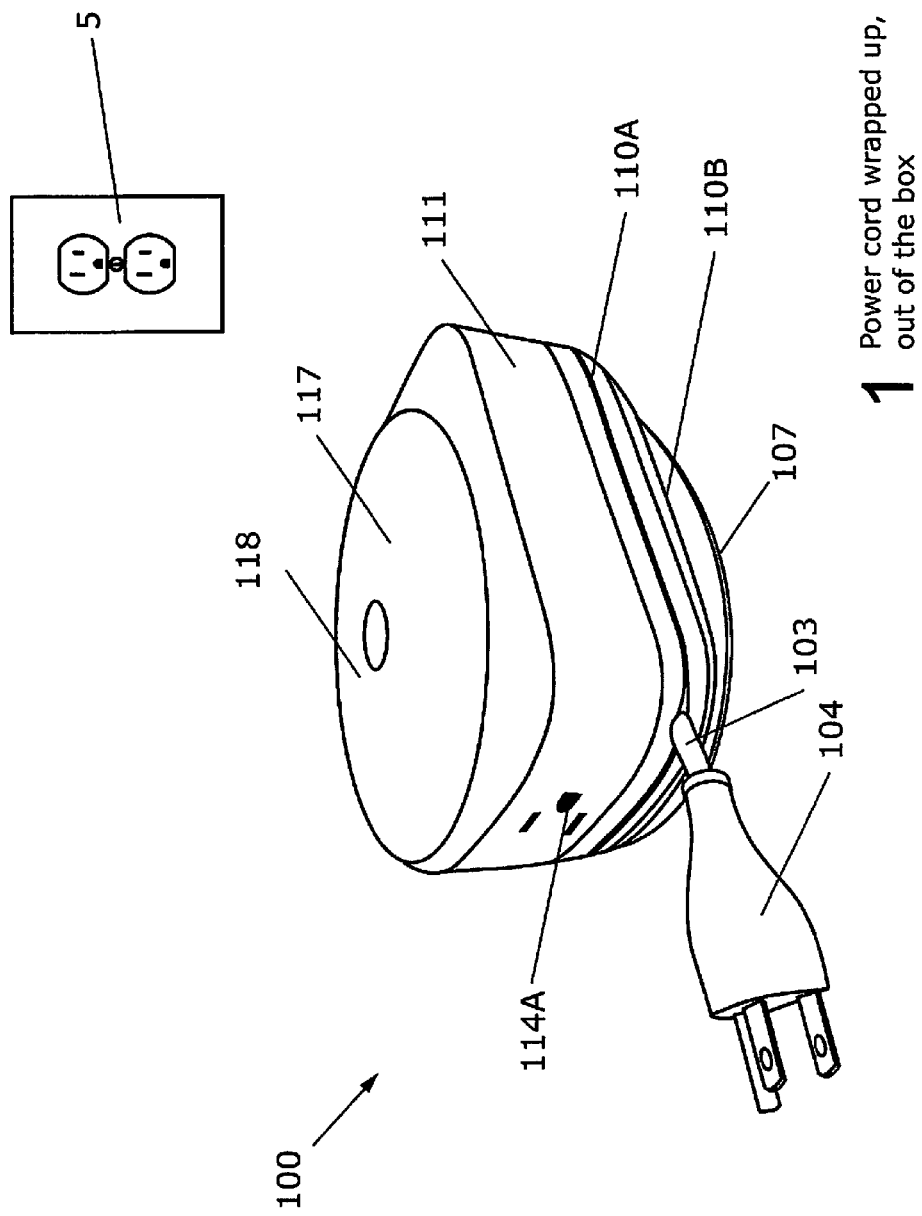
FIG. 16A is perspective view of the transportable electrical power supplying device of the second illustrative embodiment, shown in FIGS. 7A through 12, illustrating that during the first step taken when using the device to supply power to electrical appliances, the power extension cord is wound up and concealed within the first external power cord storage compartment.
Figure 16C:
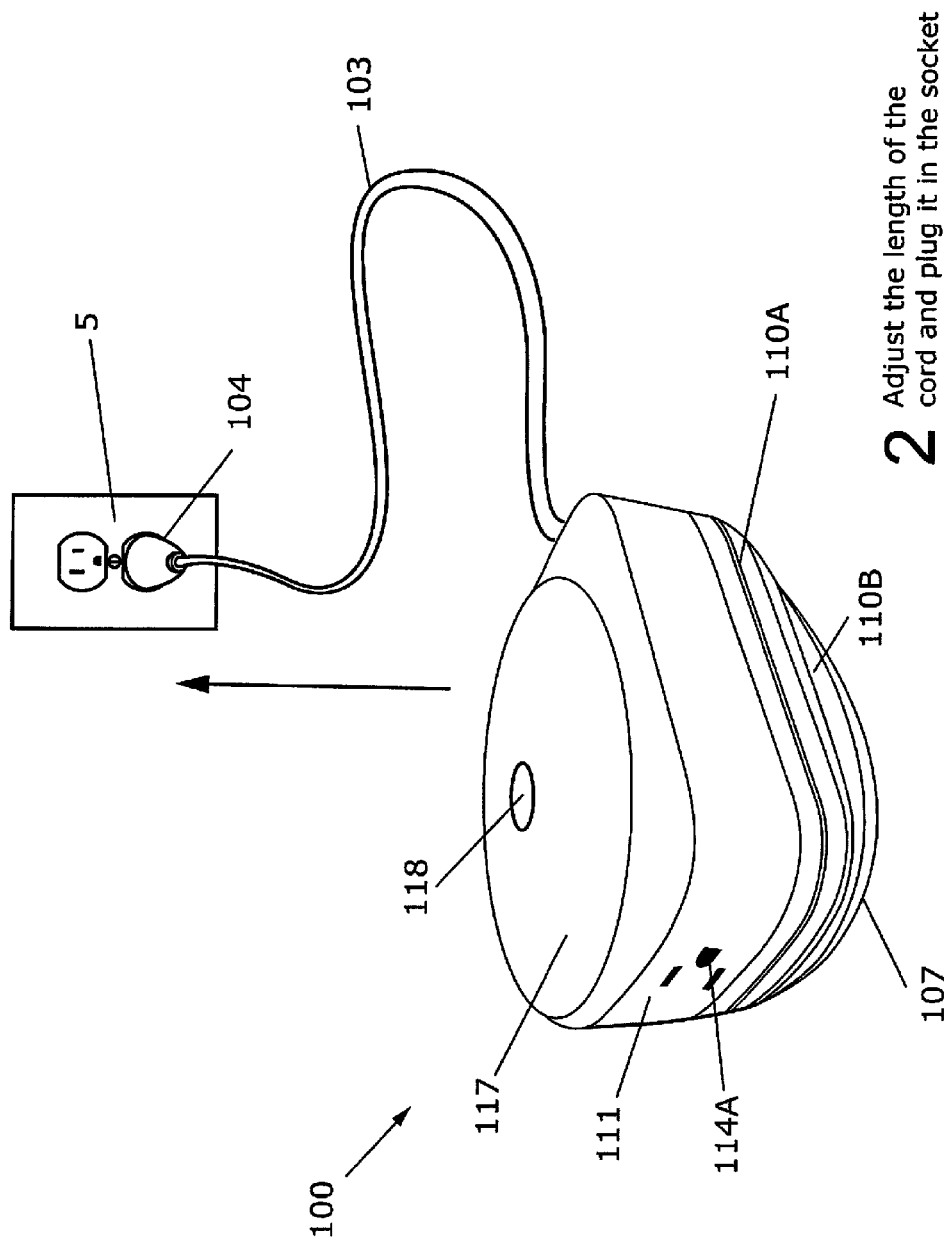
FIG. 16C is perspective view of the transportable electrical power supplying device of the second illustrative embodiment, shown in FIGS. 7A through 12, illustrating that the second step of the method involves adjusting the length of the power extension cord of the device, by wrapping it around the spool within the external power cord storage compartment and then plugging its power cord into a 120 Volt wall-mounted electrical power receptacle.

In the FIGS. 16A through 16C, the primary steps are described for a method of using the transportable electrical power supplying device 100 of the present invention.

As shown in FIG. 16A, the first involves procuring the transportable device 100, wherein its the power extension cord 103 is wound up and concealed within the first external power cord storage compartment 102A thereof.

As shown in FIG. 16B, the second step involves unwrapping the power extension cord 103 from the external cord storage compartment 102A of the transportable device 100.

As shown in FIG. 16C, the third step of the method involves adjusting the length of the power extension cord 103 of the transportable device 100, by wrapping it around the spool 108A within the external power cord storage compartment 102A and then plugging its power cord into a 120 Volt wall-mounted electrical power receptacle 5.

Figure 16D:
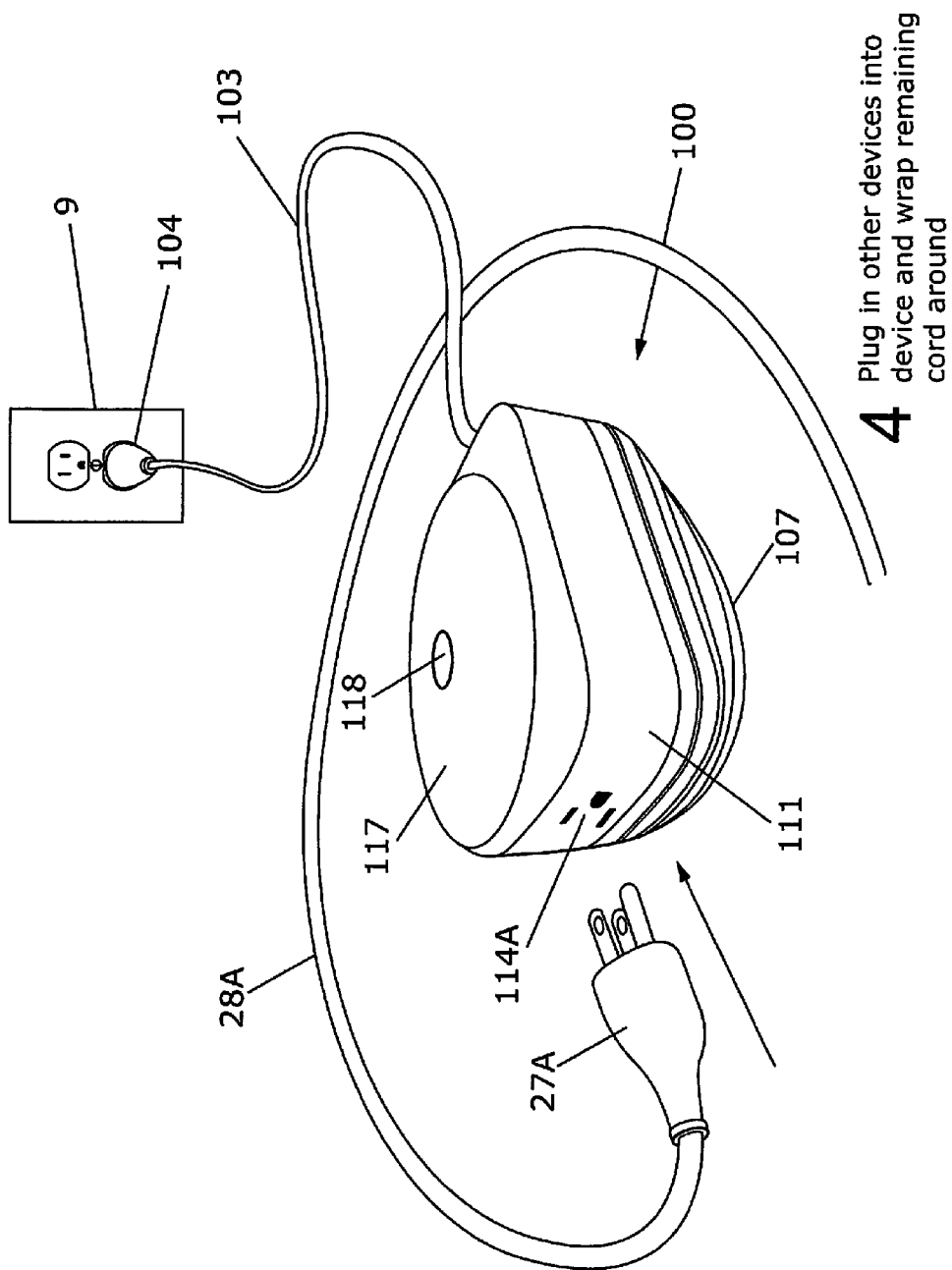
FIG. 16D is perspective view of the electrical power supplying device of the second illustrative embodiment, shown in FIGS. 7A through 12, illustrating that the second step of the method involves plugging USB-powered and/or 120 Volt powered appliances and devices into the USB-power and/or 120 Volt power receptacles provided on the device of the present invention, and wrapping any excess cord about the opening in the external power cord storage compartments.

As shown in FIG. 16D, the fourth step of the method involves plugging the AC power plug 27A and cord 28A from a 120 Volt powered appliance into one of the 120 Volt power receptacles 114A, 114B provided on the transportable device of the present invention, and wrapping any excess length of cord about the opening in the second external power cord storage compartment 102B. A USB-power plug 25A and cord 26A can also be plugged into a USB power port 115A, 115B.

Figure 16E:
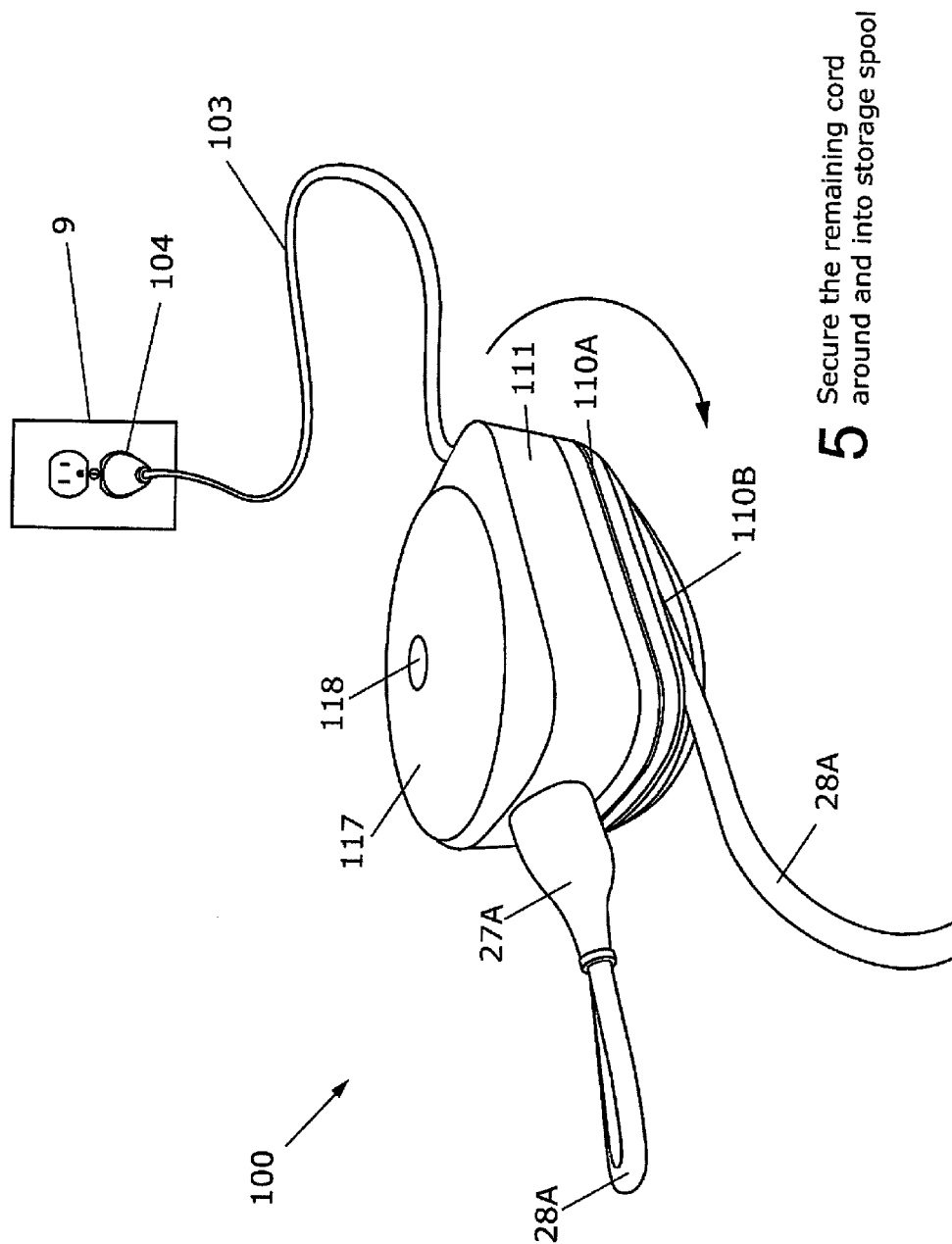
FIG. 16E is perspective view of the transportable electrical power supplying device of the second illustrative embodiment, shown in FIGS. 7A through 12, illustrating that the second step of the method involves securing any remaining power cord length about the storage spool within one of the power cord storage compartment.

As shown in FIG. 16E, the fifth step of the method involves securing any remaining power cord length about the storage spool within one of the power cord storage compartments 102A and 102B.

Figure 16F:
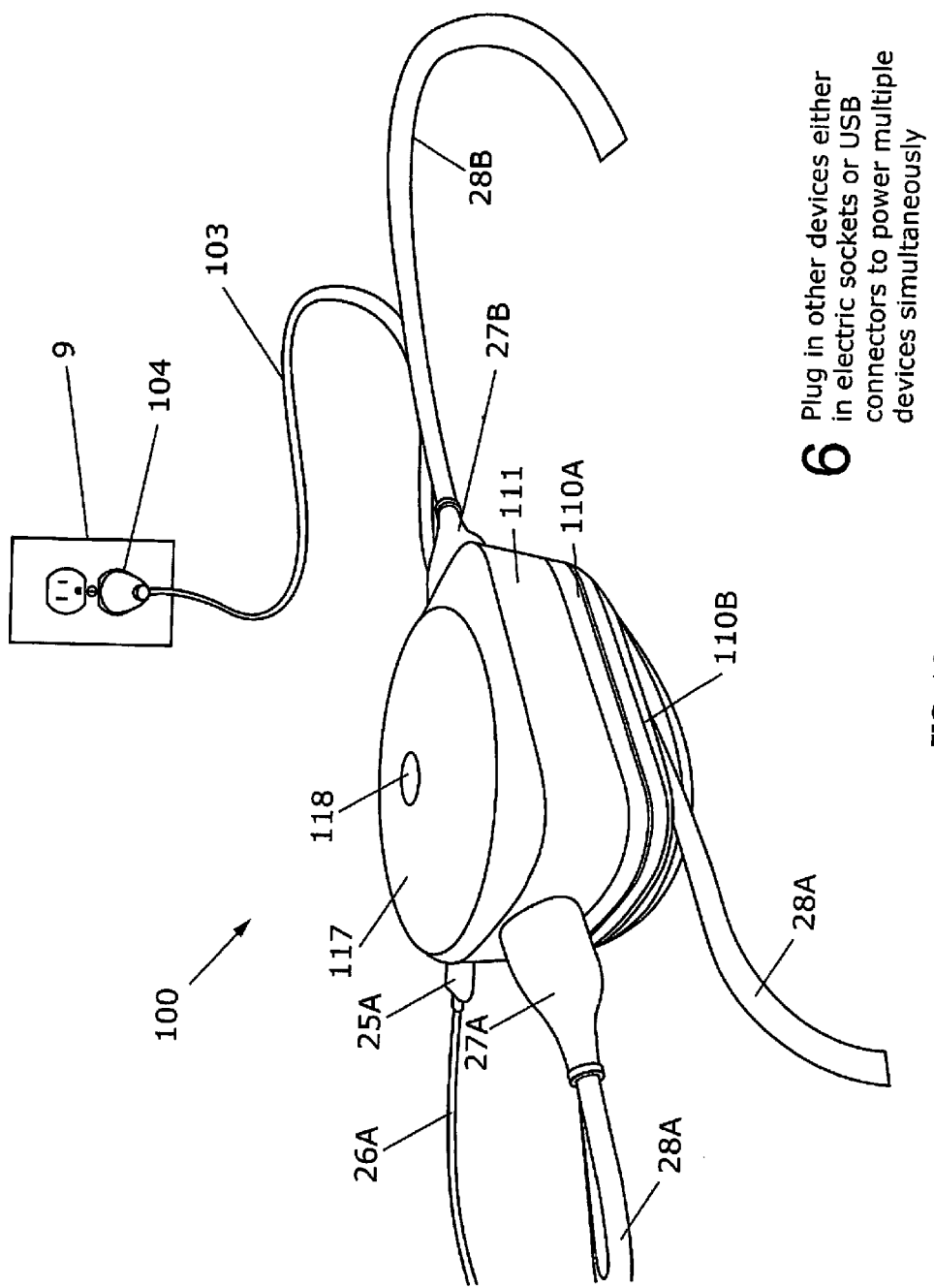
FIG. 16F is perspective view of the transportable electrical power supplying device of the second illustrative embodiment, shown in FIGS. 7A through 12, illustrating that the sixth step of the method involves plugging in other appliances into the USB-power or 120 Volt power receptacles, and wrapping excess cord about the cord storage spools within the external cord storage compartments.

As shown in FIG. 16F, the sixth step of the method involves plugging in other appliances into the USB-power or 120 Volt power receptacles, and wrapping excess cord about the cord storage spools 108A, 108B within the external cord storage compartments 102A, 102B, respectively.

Figure 17:
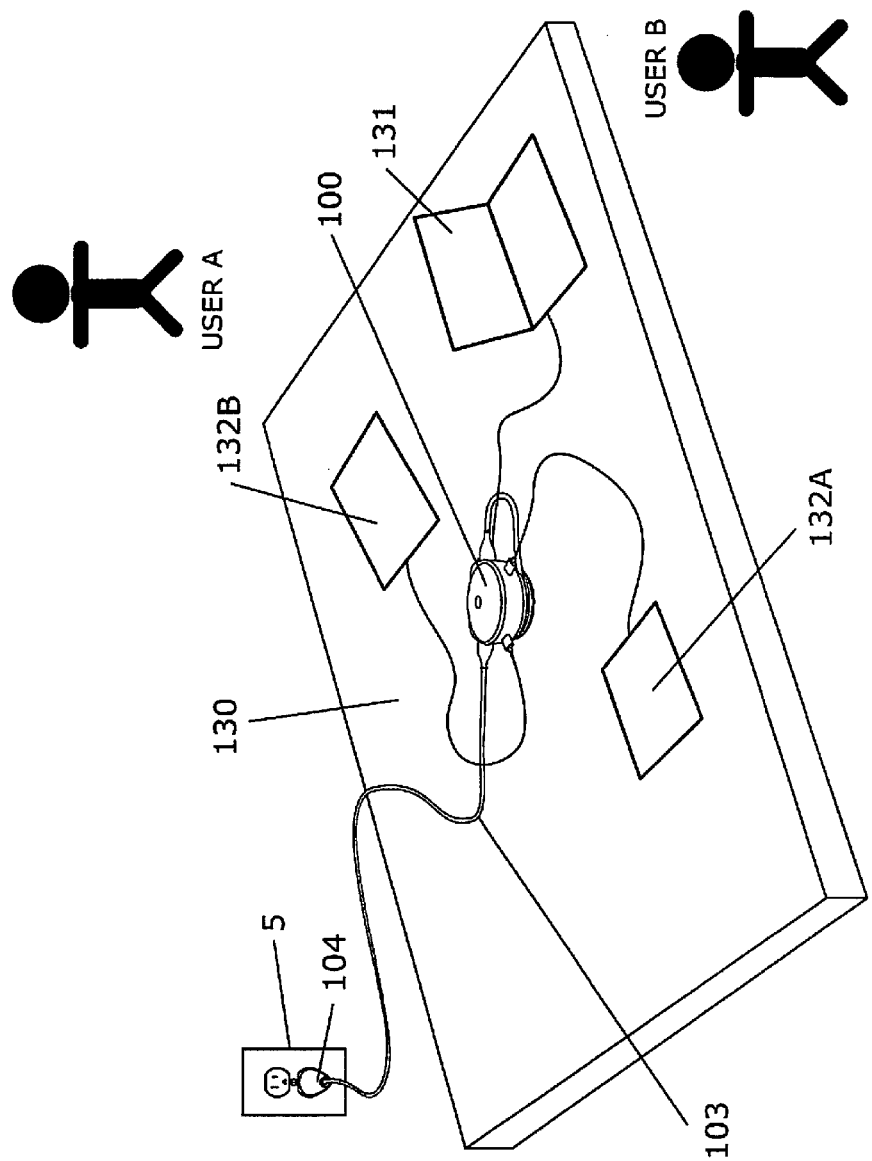
FIG. 17 is a perspective view showing two users sitting on opposite sides of a library tabletop surface, on which are supported a laptop computer and a pair of USB-powered iPad appliances, each sharing electrical power from the transportable electrical power supplying device shown in FIGS. 7A through 12, with power cords wound in a first configuration about the storage spools of the external power cord storage compartments of the device.
Figure 18:
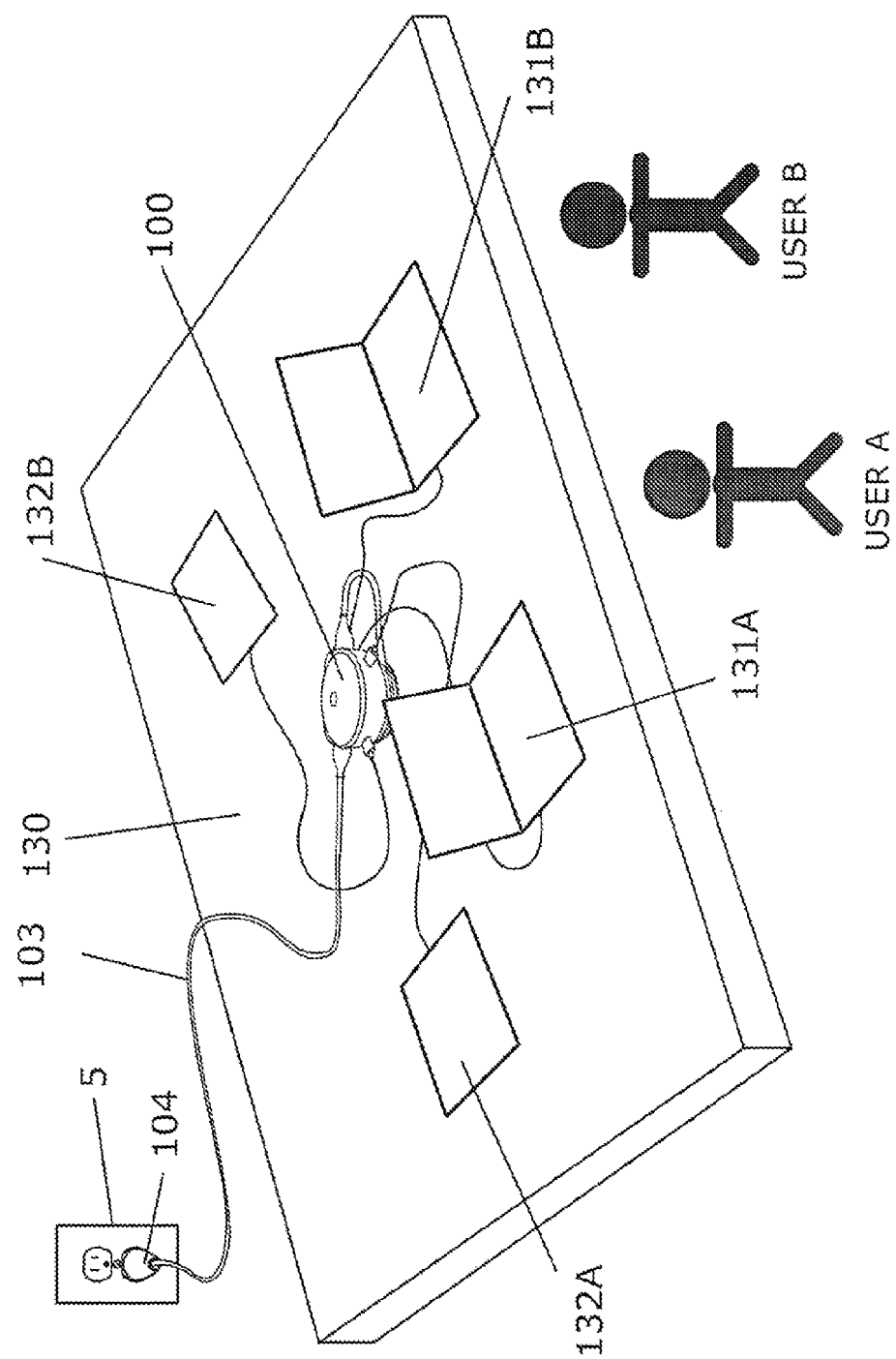
FIG. 18 is a perspective view showing two users sitting on the same side of a library tabletop surface, on which are supported a pair of laptop computers and a pair of USB-powered iPad appliances, each sharing electrical power from the transportable single electrical power supplying device shown in FIGS. 7A through 12, with power cords wound in a second configuration about the storage spools of the external power cord storage compartments of the device.

FIGS. 17 and 18 illustrate how the transportable electrical power supplying devices 1 and 100 can be used to share electrical power with friends and their appliances and devices, in diverse ways.

In FIG. 17, two users A and B are shown sitting on opposite or adjacent sides of a horizontal support surface 130, on which are supported a laptop computer 131 and a pair of USB-powered iPad appliances 132A and 132B. The horizontal surface 130 could be the surface of a library desk, a table at a coffee shop, a desktop surface at home or in the office, a deli-counter, a mechanics workbench, or any horizontal surface where two or more people could work, entertain or play together. As shown, each power consuming device disposed about the transportable power supplying device 100 is sharing electrical power from the transportable device 100, with the various power cords being wound up neatly in a first configuration about the storage spools 108A, 108B within the external power cord storage compartments 102A, 102B of the transportable device 100.

In FIG. 18, two users A and B are shown again sitting about horizontal surface 130, but this time, on the same side of the surface, on which are supported a pair of laptop computers 131A and 131B and a pair of USB-powered iPad appliances 132A and 132B. As shown, each power-consuming device is sharing electrical power from the transportable device 100, with various power cords being wound in a second configuration about the storage spools within the external power cord storage compartments 102A and 102B of the transportable device 100. Again, the horizontal surface 130 could be the surface of a library desk, a table at a coffee shop, a desktop surface at home or in the office, a deli-counter, a mechanics workbench, or any horizontal surface where two or more people could work, entertain or play together.

In each device-user configuration, the power cords of appliances receiving electrical power can be neatly wound about the power cord spool and concealed in the power cord storage compartment 102A, 102B, and power cables extended from the transportable device 100 as required by any device-user arrangement that may form on or about any horizontal work surface, as illustrated in FIGS. 17 and 18. During any work, entertainment and/or play session, a user who leaves the group can easily unwind and remove his or her power cords from the work environment, and new power cords can be wound and configured by new users to the group, as the case may be.

In general, the transportable electrical power supplying devices 1 and 100 can also be supported on a variety of surfaces other than floor surfaces, such as, for example, countertop surfaces, shelf surfaces, pedestals, table surfaces, kitchen countertop surfaces, the Earth's surface, and the like, where electrical appliances are deployed for use and require electrical power for operation. Also, while the transportable device will often be used in an interior workspace, it is understood that the transportable device of the present invention can also be used safely outdoors, provided it is protected from the natural elements, to protect from electrical shock and shorting.

Some Modifications that Readily Come to Mind

In the event that significant electromagnetic fields (EMFs) are generated by 60 HZ electrical currents flowing through appliance power cords during device operation, then EMF shielding measures or techniques known in the EMF shielding art can be practiced to reduce or eliminate the electromagnetic field strength outside the device during operation. Such EMF shielding measures might include applying metallic foil to the interior surfaces of the housing components, as well as other suitable measures known in the art.

Also, in general, the housing and other components of the electrical power supplying device of the present invention can be manufactured using injection molded plastics and/or other materials having suitable characteristics and properties which will be known to those skilled in the art.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A transportable electrical power supplying device for supplying AC and DC electrical power to a plurality of electrical appliances and/or electronic devices located in an environment, comprising:

a power supply cord for plugging into a standard AC power receptacle by way of a power supply plug, and supplying AC electrical power to said transportable electrical power supplying device;

wherein each said electrical appliance and/or electronic device has a power cord routable through the environment and terminating with an appliance power plug pluggable into said transportable electrical power supplying device;

a first housing portion having (i) an interior volume containing one or more electrical circuits electrically connected to said power supply cord and concealed within said first housing portion by a cover portion, and (ii) an exterior surface for supporting a plurality of AC electrical receptacles electrically connected to said one or more electrical circuits and at least one USB-type DC electrical receptacle;

a second housing portion, operably connected to said first housing portion, for supporting one or more external power cord storage compartments;

wherein each said external power cord storage compartment includes an internal power cord storage spool contained within each said external power cord storage compartment, and a pair of resilient power cord retention and concealment disc structures disposed in each said external power cord storage compartment and arranged in a spaced apart manner so as to form a perimeter access opening, permitting excess power cord to be (i) wound up about said internal power cord storage spool and (ii) substantially concealed behind said pair of resilient power cord retention and concealment disc structures, while allowing any remaining power cord to exit through said perimeter access opening at any point about said transportable electrical power supplying device and routed to said electrical appliance or electronic device;

wherein each said external power cord storage compartment supports a number of turns of excess power cord wrapped about said internal power cord storage spool, while said resilient power cord retention and concealment disc structures retain the wound power cord in place about said internal power cord storage spool and prevent the excess power cord from unwinding and spilling out through said perimeter access opening and unwinding off said internal power cord storage spool; and wherein, when wound-up excess power cord concealed behind said resilient power cord retention and concealment disc structures is pulled out from said perimeter access opening with sufficient force, said resilient power cord retention and concealment disc structures elastically deform and allow the pulled excess power cord to be removed from said external power cord storage compartment and used in supplying electrical power to said electrical appliance or electronic device at some preselected distance located from said transportable electrical power supplying device.

2. The transportable electrical power supplying device of claim 1, wherein said resilient power cord retention and concealment disc structures are configured to press against and exert forces against each said resilient power cord retention and concealment disc structure so as to substantially close off said perimeter access opening and substantially conceal excess power cord wound about said internal power cord storage spool.

3. The transportable electrical power supplying device of claim 1, wherein said resilient power cord retention and concealment disc structures are configured to not press against and exert forces against each said resilient power cord retention and concealment disc structure, but otherwise substantially close off said perimeter access opening and substantially conceal excess power cord wound about said internal power cord storage spool.

4. The transportable electrical power supplying device of claim 1, wherein said upper housing portion has side walls with apertures, and wherein said one or more electrical circuits comprises a printed circuit (PC) board supplying electrical power to said at least two AC electrical receptacles, and at least one USB-type DC electrical receptacle mounted through said apertures formed through the side walls of said upper housing portion.

5. The transportable electrical power supplying device of claim 4, wherein said cover portion includes a translucent logo/badge, and said PC board supplies power to an LED-based power-on indicator light illuminating said translucent logo/badge.

6. The transportable electrical power supplying device of claim 5, wherein each electronic device has a flexible cable terminating in a USB plug pluggable into one said USB-type DC electrical receptacle, and wherein each said electrical appliance has an electrical plug pluggable into one said AC electrical receptacle.

7. The transportable electrical power supplying device of claim 1, wherein each said AC receptacle comprises a 120 Volt AC electrical power receptacle, and each said USB-type DC electrical receptacle comprises a USB power port.

8. The transportable electrical power supplying device of claim 7, wherein each electronic device has a flexible cable terminating in a USB plug plugged into one said USB power port, and wherein each said electrical appliance has an electrical plug pluggable into one said 120 Volt AC electrical power receptacle.

* * * * *